United States Patent
Strong et al.

(10) Patent No.: US 10,377,408 B2
(45) Date of Patent: Aug. 13, 2019

(54) ENERGY ABSORPTION MODULE FOR VEHICLE STEERING COLUMN ASSEMBLY

(71) Applicant: NSK Americas, Inc., Ann Arbor, MI (US)

(72) Inventors: Scott Lewis Strong, Manchester, MI (US); Damir Menjak, Frankenmuth, MI (US)

(73) Assignee: NSK Americas, Inc., Ann Arbor, MI (US)

( * ) Notice: Subject to any disclaimer, the term of this patent is extended or adjusted under 35 U.S.C. 154(b) by 202 days.

(21) Appl. No.: 15/513,326

(22) PCT Filed: Sep. 22, 2015

(86) PCT No.: PCT/US2015/051382
§ 371 (c)(1),
(2) Date: Mar. 22, 2017

(87) PCT Pub. No.: WO2016/048979
PCT Pub. Date: Mar. 31, 2016

(65) Prior Publication Data
US 2017/0247047 A1    Aug. 31, 2017

Related U.S. Application Data

(60) Provisional application No. 62/053,261, filed on Sep. 22, 2014.

(51) Int. Cl.
*B62D 1/19* (2006.01)
*B62D 1/185* (2006.01)
*B62D 1/187* (2006.01)

(52) U.S. Cl.
CPC ............ *B62D 1/195* (2013.01); *B62D 1/185* (2013.01); *B62D 1/187* (2013.01); *B62D 1/192* (2013.01)

(58) Field of Classification Search
CPC ........ B62D 1/195; B62D 1/187; B62D 1/185; B62D 1/192
See application file for complete search history.

(56) References Cited

U.S. PATENT DOCUMENTS 7,455,321 B2 * 11/2008 Menjak .................. B62D 1/195
    280/777
8,590,933 B2    11/2013 Narita et al.
(Continued)

FOREIGN PATENT DOCUMENTS

JP    2003-148537 A    5/2003
JP    2006-199180 A    8/2006
(Continued)

OTHER PUBLICATIONS

International Search Report and Written Opinion for International Application No. PCT/US2015/051382; dated Feb. 18, 2016.

*Primary Examiner* — James A English
(74) *Attorney, Agent, or Firm* — The Dobrusin Law Firm, P.C.

(57) ABSTRACT

An energy absorption module subassembly for a steering column assembly comprising; an energy absorption device; and a retainer assembled with the energy absorption device configured for i) installation into at least a portion of a column housing of the steering column assembly at a first location; ii) supportively carrying the energy absorption device at least partially within the retainer; and enabling the retainer to at least partially deform in response to a load occasioned during an impact collapse stroke of an inner column tube of the steering column assembly that forces the retainer to translate in a forward direction to a second location that is forward in a vehicle relative to the first location.

20 Claims, 17 Drawing Sheets

(56) References Cited

U.S. PATENT DOCUMENTS

| | | | |
|---|---|---|---|
| 8,678,437 B2 | 3/2014 | Narita et al. | |
| 9,533,699 B2 | 1/2017 | Chiba | |
| 2005/0236825 A1* | 10/2005 | Sawada | B62D 1/184 280/775 |
| 2009/0044657 A1* | 2/2009 | Osawa | B62D 1/184 74/493 |
| 2011/0175335 A1* | 7/2011 | Takezawa | B62D 1/184 280/775 |

FOREIGN PATENT DOCUMENTS

| | | |
|---|---|---|
| WO | 2012/017853 A1 | 2/2012 |
| WO | 2012/017854 A1 | 2/2012 |
| WO | 2014/038398 A1 | 3/2014 |

* cited by examiner

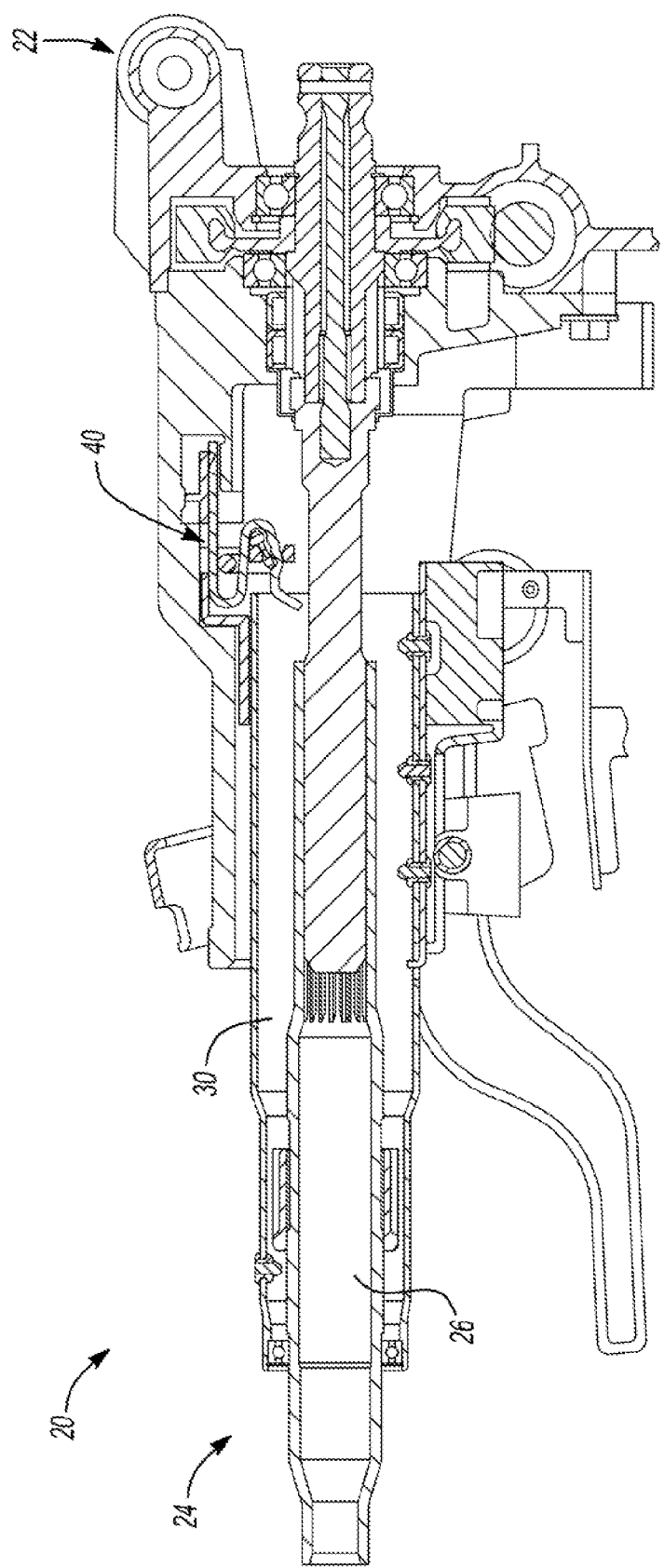

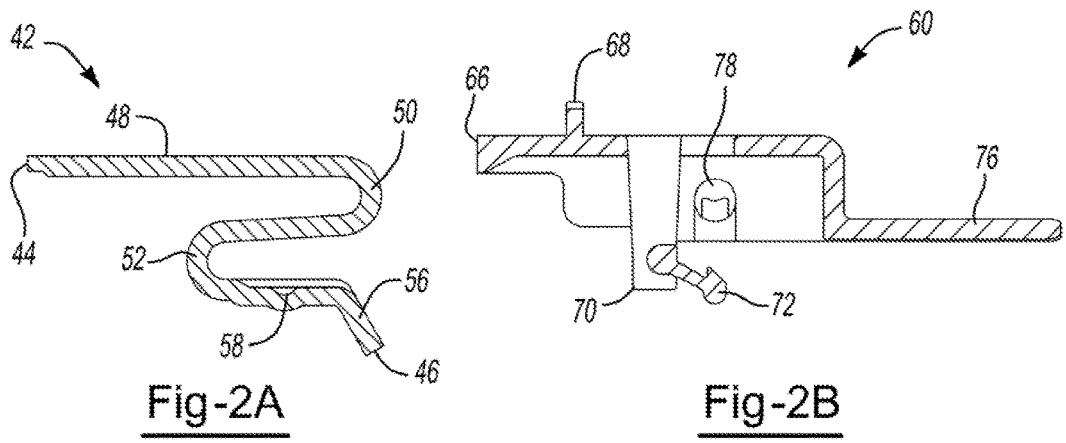
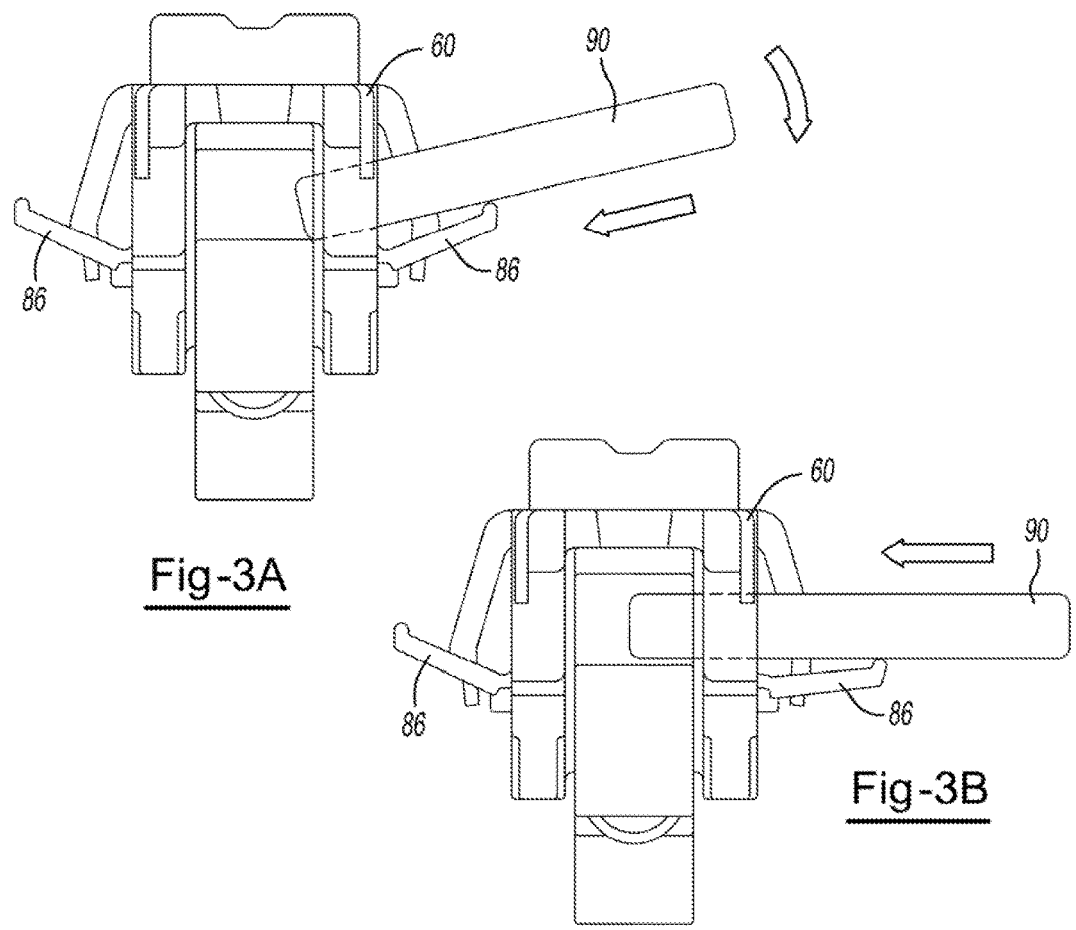

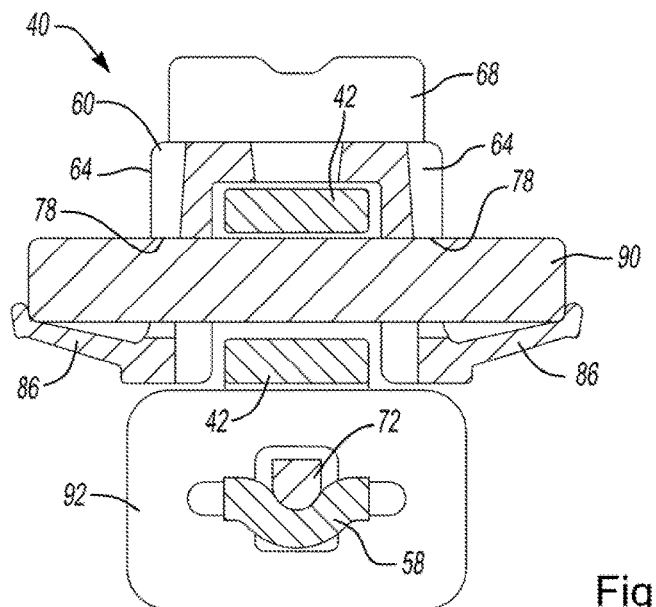
Fig-3C
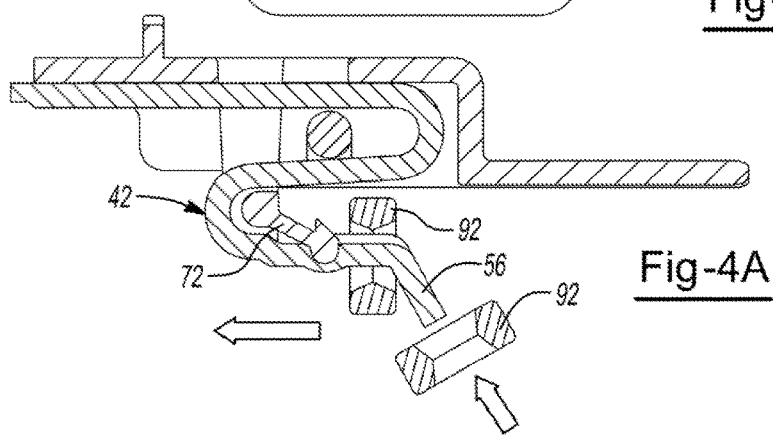
Fig-4A
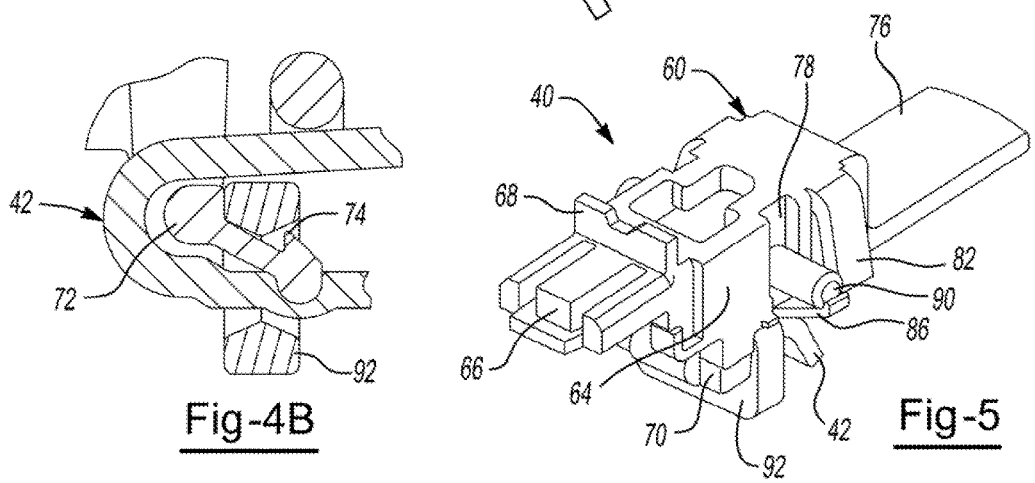
Fig-4B
Fig-5

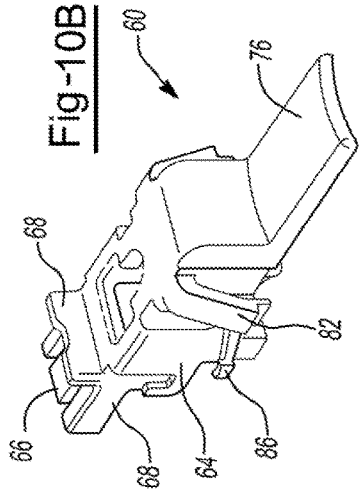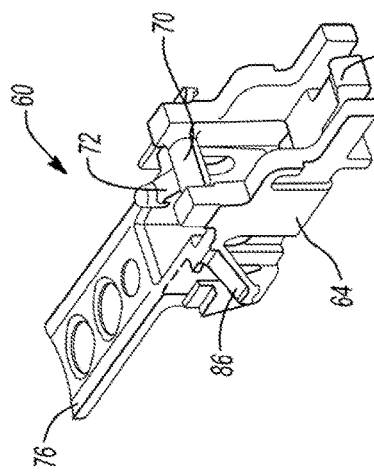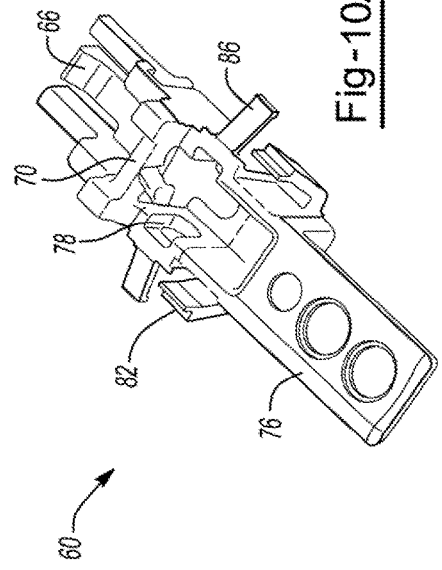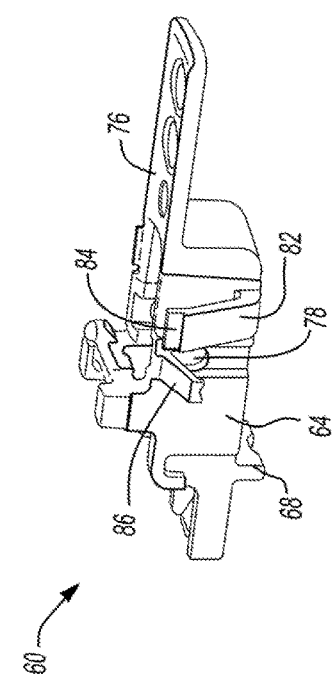

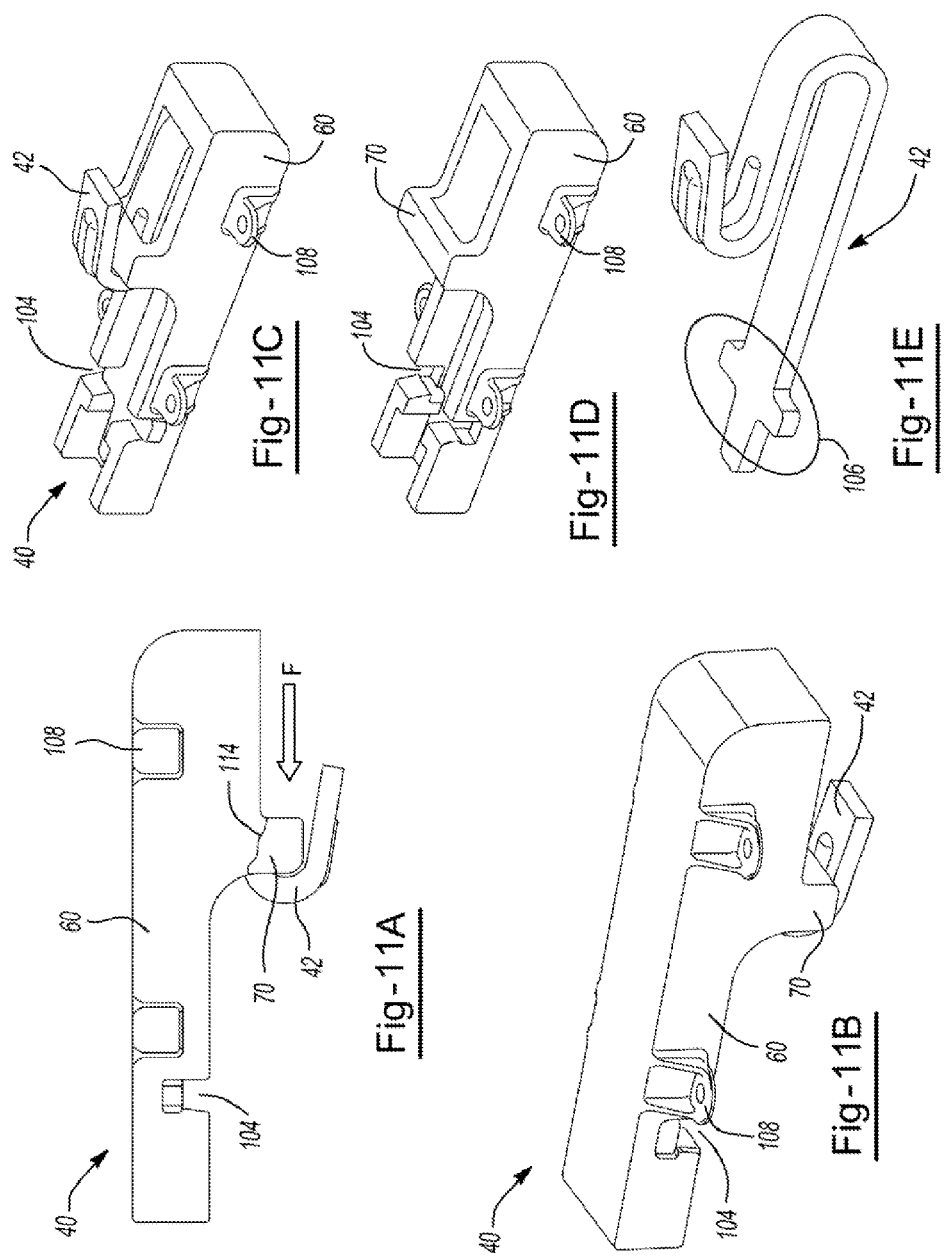

ENERGY ABSORPTION MODULE FOR VEHICLE STEERING COLUMN ASSEMBLY

CLAIM OF BENEFIT OF FILING DATE

The present application claims the benefit of the filing date of U.S. Application No. 62/053,261, filed on Sep. 22, 2014, which is hereby incorporated by reference in its entirety.

FIELD

In general, the present teachings relate to an improved collapsible steering column assembly and methods associated with the same (e.g., methods of providing energy absorption, such as in a secondary impact). More particularly, the present teachings relate to an energy absorption module for absorbing energy upon an impact.

BACKGROUND

During a vehicle collision, there are commonly two impacts. In a primary impact, the vehicle impacts another object. In a secondary impact, a vehicle occupant impacts a component of the vehicle. For example, a vehicle operator sometimes impacts the steering wheel due to inertia. In order to help try to protect drivers from such secondary impacts, it has become common practice to use an impact-absorbing type steering column.

The structure of an impact-absorbing type steering column apparatus is such that when the driver suffers a secondary impact, the impact energy acts on the steering column in the frontward direction of the vehicle. The steering column or components thereof may detach from one or more fixation points with the vehicle body and move forward (e.g., in a collapse stroke), so that the impact energy is absorbed in the course of the collapse stroke. During a collapse stroke from a secondary impact, or other impact, components of the assembly will longitudinally collapse (e.g., generally within the volume it occupies within the vehicle in normal operation; that is, generally within its "footprint" in the vehicle), but generally will not collapse beyond a certain distance relative to a predetermined fixation point.

Notwithstanding efforts to improve internally collapsible steering column assemblies, there remains a need for alternative assemblies, particularly those in which assembly is simplified. There is also a need for improved or greater energy absorption during a secondary impact.

SUMMARY

The present teachings make use of a simple, yet elegant, construction approach by which relatively few components can be employed for forming an energy absorption module subassembly for a steering column assembly (e.g., a collapsible steering column assembly) that exhibits good energy absorption characteristics, especially during an impact collapse stroke (e.g., a secondary impact).

By way of summary, in one aspect, the teachings herein relate to an energy absorption module subassembly for a steering column assembly comprising an energy absorption device; and a retainer assembled with the energy absorption device configured for i) installation into at least a portion of a column housing of the steering column assembly at a first location; ii) supportively carrying the energy absorption device at least partially within the retainer; and enabling the retainer to at least partially deform in response to a load occasioned during an impact collapse stroke of an inner column tube of the steering column assembly that forces the retainer to translate in a forward direction to a second location that is forward in a vehicle relative to the first location. The retainer may absorb energy during the impact collapse stroke of the inner column tube by both plastic deformation of the retainer and translation in the forward direction. The energy absorption device may absorb energy by plastic deformation during the impact collapse stroke of the inner column tube, and at least a portion of the energy absorption by the energy absorption device results from plastic deformation that occurs after the retainer has reached the second location.

The teachings herein also contemplate methods of absorbing energy in a steering column assembly comprising using the energy absorption module subassembly. The method may comprise a step of absorbing energy by way of a forward translation of the retainer and energy absorption device of the energy absorption module subassembly. The method may include a step of absorbing energy by way of the energy absorption device plastically deforming as a result of i) a forward end of the energy absorption device being constrained against forward movement by a portion of the column housing; ii) a coiling of the energy absorption device in a direction toward a rigid member associated with the retainer; iii) a pulling of the energy absorption device around the rigid member; iv) an anchoring engagement of a hook portion of the energy absorption device against a shoulder of a shaft or shaft profile (e.g., a torque sensor shaft) to alter energy absorption of the steering column assembly; or any combination thereof.

As can be seen, it is thus possible to realize a unique steering column assembly and energy absorption module subassembly (and associated methods) that provide for simplified assembly and enable a steering column assembly to absorb energy during a secondary impact vehicle collision.

BRIEF DESCRIPTION OF THE DRAWINGS

FIG. 1 is a side cross-sectional view of a steering column assembly.

FIG. 2A is a side view of an energy absorption device of an energy absorption module.

FIG. 2B is a side view of a retainer of an energy absorption module.

FIGS. 3A, 3B, and 3C illustrate a process of inserting a rigid member (e.g., a pin or other elongated member) into the retainer of FIG. 2B.

FIGS. 4A and 4B illustrate installation of a damper in the energy absorption module.

FIG. 5 is a perspective view of an energy absorption module.

FIGS. 10A, 13B, 10C, and 10D are perspective views of a retain of an energy absorption module.

FIGS. 11A, 11B, and 11C are views of an assembled energy absorption module.

FIG. 11D is a perspective view of the retainer of FIGS. 11A-11C.

FIG. 11E is a perspective view of an energy absorption device of FIGS. 11A-11C.

DETAILED DESCRIPTION

Figure 6A:
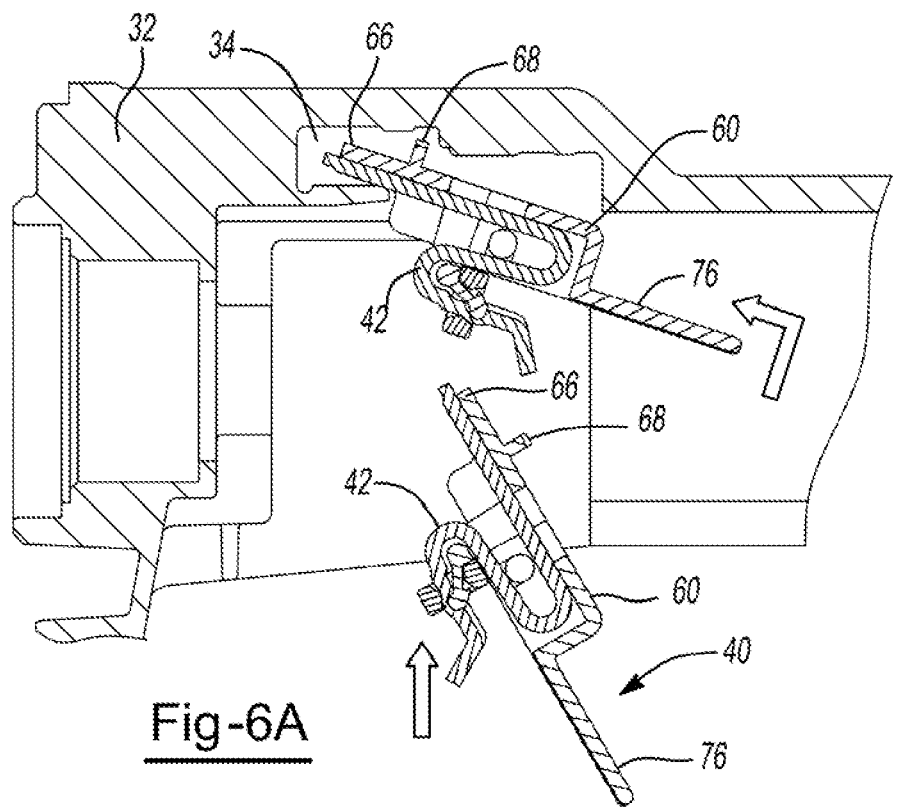
FIG. 6A illustrates a method of installing an energy absorption module into a steering column assembly.
Figure 6B:
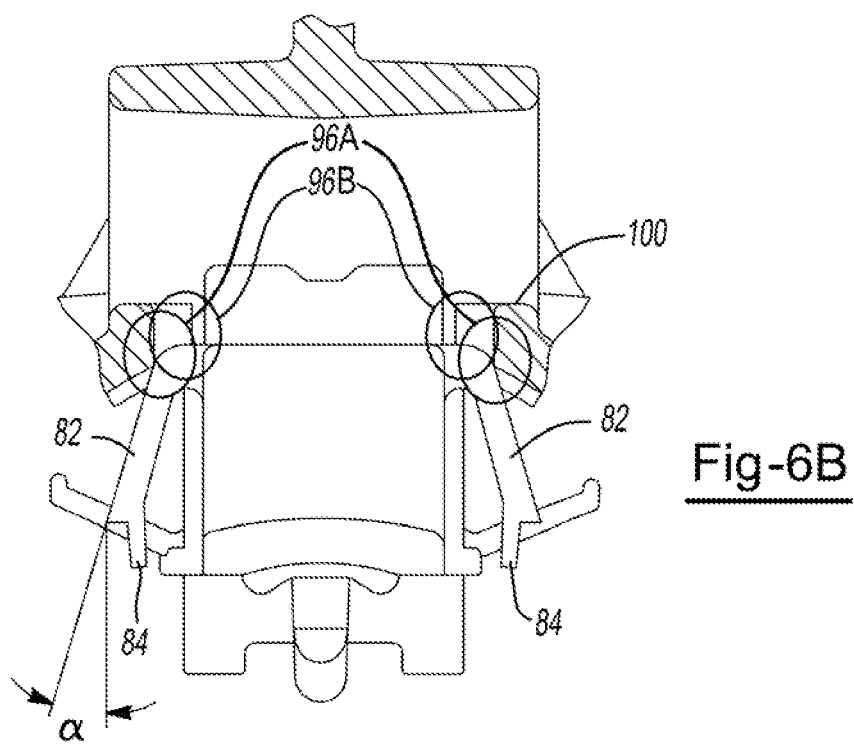
FIG. 6B is a partial cutaway view of an energy absorption module.
Figure 6C:
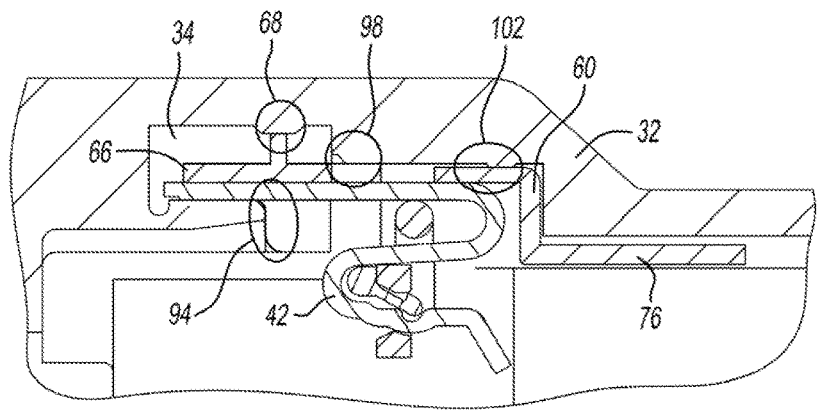
FIG. 6C is an enlarged view of the circled portion of FIG. 1 showing a side cross sectional view of an energy absorption module installed in a steering column assembly.
Figure 6D:
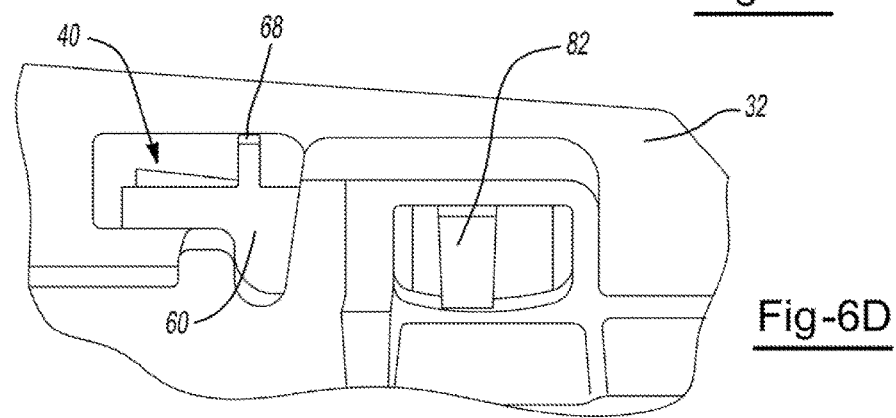
FIG. 6D is a side view of an energy absorption module installed in a steering column assembly.

As required, detailed embodiments of the present teachings are disclosed herein; however, it is to be understood that the disclosed embodiments are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, and as will be appreciated from the description that follows, the present teachings pertain to an energy absorption module subassembly for a steering column assembly for an automotive vehicle. The steering column assembly will typically include an inner column tube, a steering shaft, and a column housing, with an energy absorption module subassembly installed therein or thereon. The energy absorption module subassembly for the steering column assembly includes an energy absorption device and a retainer assembled with the energy absorption device. The retainer may be configured for i) installation into at least a portion of the column housing of the steering column assembly at a first location; ii) supportively carrying the energy absorption device at least partially within the retainer; iii) enabling the retainer to at least partially deform in response to a load occasioned during an impact collapse stroke of the inner column tube of the steering column assembly that forces the retainer to translate in a forward direction to a second location that is forward in a vehicle relative to the first location; or any combination of i) through iii). The retainer may absorb energy during the impact collapse stroke of the inner column tube by plastic defor- mation of the retainer and/or translation in the forward direction. The energy absorption device may absorb energy by plastic deformation during the impact collapse stroke of the inner column tube. At least a portion of the energy absorption by the energy absorption device may result from plastic deformation that occurs after the retainer has reached the second location.

A steering column assembly may generally include a tube that is operatively connected with a steering wheel (not shown), e.g., via a steering shaft. One such tube, referred to herein as an inner column tube, typically will have a hollow cavity along at least a portion of (if not the entirety of) the length of the tube and may be sized and configured to receive and support a rotatable shaft, namely a steering shaft and possibly one or more bearings. Both the shaft and the tube will have a longitudinal axis. When installed in a vehicle, the longitudinal axis of each the shaft and the tube (as well as the steering column assembly in general) may be generally coaxially aligned, aligned generally parallel with a longitudinal axis of a vehicle, or each. The shaft and the inner tube typically will be made of a suitable metal, such as steel or aluminum.

The inner column tube may be generally cylindrical and hollow. It may have a forward end portion and a rearward end portion, and a longitudinal axis. Either or both of the forward or rearward end portion may include a suitable bearing that supports a shaft of the steering column assembly (e.g., a steering shaft for rotation, a torque sensor shaft, or both).

The shaft of the steering column assembly may include a steering shaft that may have a rearward end portion adapted to receive a steering wheel (not shown). It may have a forward end portion that penetrates through and may be supported by a bearing, a key lock collar of both. As noted, the steering shaft may be supported for rotation at least in part by the inner column tube and have a longitudinal axis that may be generally coaxially aligned with the longitudinal axis of the inner column tube. The shaft of the steering column assembly may include a torque sensor shaft. The shaft of the steering column assembly may have a shoulder or a shaft profile that alters and/or assists in energy absorption during a stroke collapse (e.g., a secondary impact). For example, the shoulder may provide an area of contact for the energy absorption device within the steering column assembly during a collapse stroke (e.g., a secondary impact). The shoulder may serve as a stop for the energy absorption device as it deforms during a collapse stroke (e.g., a secondary impact). The energy absorption device may further deform as a result of the contact with the shoulder or shaft profile.

A column housing may be mounted at a mounting location (e.g., a permanently fixed mounting, a pivotal mounting, or both) within the automotive vehicle. The column housing at least partially surrounds the inner column tube in clamping relation with the inner column tube (e.g., when the lever is in a desired position in a manual assembly) so as, to permit steering shaft tilt adjustment by way of a steering wheel adjustment subassembly. The column housing may include an elongated longitudinally oriented opening that defines opposing inner wall surfaces that are urged toward the inner column tube for clamping the column tube into position (e.g., by use of the lever to actuate hardware of the subassembly, such as a cam fix, cam move elements and/or thrust bearing). The column housing may be a cast structure (e.g., an aluminum or steel containing casting). The column housing may be specifically designed to receive an energy absorption module subassembly as disclosed herein. During an impact collapse stroke (e.g., a secondary impact), the column housing may remain in a generally fixed position relative to the mounting location. During an impact collapse stroke, a clamping force (or other force that keeps the inner column tube in position within the column housing) that clamps (or otherwise retains) the side walls of the column housing may remain clamped or may be released to allow the inner column tube to translate relative to the column housing.

An energy absorption module subassembly may be installed within, on, or both, the column housing. The energy absorption module subassembly may include an energy absorption device and a retainer that supports the energy absorption device. The energy absorption module subassembly may optionally include a damper for absorbing energy during an impact collapse stroke of the steering column assembly, for securing the energy absorption device within the retainer, or both. The energy absorption module subassembly may optionally include an end cap that provides damping during an impact collapse stroke of the steering column assembly. The end cap may be used alone or in combination with a damper.

The retainer may function to support, carry, and/or house the energy absorption device. The retainer may function to secure the energy absorption module within the steering column assembly. The retainer may function to absorb energy during an impact collapse stroke (e.g., a secondary collision). The retainer may have a first end and a second end. The first end may be adapted to be located toward a forward portion of a vehicle relative to the second end. The process of manufacturing the retainer may be free of die slides. The elements of the retainer (e.g., laterally spaced detents, compression finger, retention member, preload structures, or combination thereof) may be formed by die cavities interfacing with proper die shut off angles.

The retainer may include a carrier portion (e.g., a body portion) that adjoins the first end of the retainer. The carrier portion may include one or more elements for securing, supporting, or both, the energy absorption device within the retainer and/or the retainer within the steering column assembly. The carrier portion may be configured to supportively carry the energy absorption device. The carrier portion may include a pair of generally opposing side walls. One or more of the side walls may include a through hole opening therein (e.g., opposing through holes on opposing side walls) adapted to receive a rigid member. The carrier portion may include one or more preload structures (e.g., laterally spaced outwardly projecting compression fingers) substantially juxtaposed with the through hole opening in each side wall. The preload structures may function to guide insertion of a rigid member into the retainer, secure the rigid member within the retainer, reduce or prevent vibration of the rigid member within the energy absorption module subassembly, or combination thereof. The generally opposing side walls may be joined by a bridge. The bridge may function to provide additional support to the energy absorption device, provide additional structure and support to the retainer, provide additional energy absorption (e.g., by bending and/or breaking away from the retainer upon an impact collapse stroke of an inner column tube of the steering column assembly upon exceeding a particular load), or combination thereof. The carrier portion may include a retention member that is disposed in a location between the generally opposing side walls (e.g., extending from the bridge). The retention member may apply a force to the energy absorption device, which may function to prevent vibration of the energy absorption device, keep the energy absorption device in proper position within the retainer, or both. Following the breakaway event of the bridge upon exceeding a threshold load during an impact collapse stroke, the bridge may be free and may only be controlled by being trapped by or in between parts of the energy absorption device (e.g., the second arcuate portion) and the forward end of the inner column tube. The retention member may resist rotation of the bridge and control the loose piece after breakaway.

The carrier portion may include a longitudinally oriented compression finger extending toward the first end for applying pressure to an energy absorption member. The compression finger may provide a force that pushes generally downwardly toward or on at least a portion of the energy absorption device that is located within the carrier portion. This may function to keep the energy absorption device, the energy absorption module subassembly, or both, from moving and/or vibrating. The compression finger may function to assist in installation of the energy absorption module subassembly into the steering column assembly (e.g., until the energy absorption module subassembly is snap fit into its resting position within the column housing). The carrier portion of the retainer may include an (i.e., one or more) additional support (e.g., located at the base of the compression finger, at the free end of the compression finger, therebeween, or a combination thereof) that projects upwardly from a top location of the carrier portion to contact the column housing, provide additional strength to the retainer, minimize vibration of the retainer within the column housing, resist the tendency of the retainer to push up during a collapse stroke, or combination thereof.

The retainer may have a securing portion that is adapted to be mechanically fit (e.g., snap fit, friction fit, interference fit, fastened, or otherwise) within a portion of the column housing of the steering column assembly. The securing portion may assist in aligning the retainer within the column housing during assembly. The securing portion may be self-aligning. The securing portion may reduce or eliminate the need for additional fasteners (e.g., screws, pins). The securing portion may be carried on the carrier portion. The securing portion may be integrally formed with the carrier portion. The securing portion may include a pair of laterally spaced detents that are hingedly connected to the carrier portion (e.g., at a side wall) for allowing the snap fit of the retainer into the column housing. The laterally spaced detents may take any shape that allows for the retainer to be mechanically fit within the column housing. The laterally spaced detents may have an angular relationship with the side walls of the retainer that assist in aligning the retainer within the column housing during installation. The outer surface of the laterally spaced detent may form an angle. The angle α may be the angle measured by a plane that is coplanar with and extends from the outer surface of the laterally spaced detent and a vertical plane extending through the endpoint of the outside surface (which may be parallel to one or more of the side walls of the retainer, the thin protrusion, or both). The angle may be about 2 degrees or greater, about 5 degrees or greater, or about 10 degrees or greater. The angle may be about 90 degrees or less, about 45 degrees or less, or about 25 degrees or less (e.g., about 15.7 degrees). A free end of each laterally spaced detent may include a thin protrusion. The thin protrusion may allow for the retainer to snap into place. The thin protrusion may engage with a portion of the column housing. When the thin protrusion is snapped into its proper position, it may provide an audible feedback of engagement. The audible feedback may result from the thin protrusions making contact with the column housing. The thin protrusions may also provide resistance during an impact collapse stroke. For example, the thin protrusions may resist the tendency of the laterally spaced detents to spread open and fail to support the retainer (e.g., due to the engagement with the column housing).

The retainer may include a tongue portion that extends (e.g., longitudinally) away from the carrier portion and may be configured to be located in a space between the column housing and the inner column tube to help resist dislocation of the retainer from its installed position. The tongue portion may be located toward a rear portion of a vehicle relative to the first end. The tongue portion may have a generally planar body. The tongue portion may include one or more curves, contours, angled segments, or the like (e.g., a shape that generally matches the contours of the outer diameter of the inner column tube). The tongue portion may prevent the energy absorption module subassembly from dislodging from its place within the steering column assembly. The tongue portion may be unable to rotate past the column tube, thereby keeping the energy absorption module subassembly in a proper position (e.g., even if another securing element, such as the laterally spaced detents, were to somehow fail).

The carrier portion, securing portion, tongue portion, or any combination may be integrally formed. The retainer may be an integrally molded body formed of any material (e.g., a molded plastic body).

The retainer may include one or more openings in the carrier body for receiving and carrying a rigid member (e.g., a pin, such as a needle roller bearing element or other elongated member). The rigid member may provide a surface for guiding plastic deformation of the energy absorption device. The rigid member may have a yield strength that is higher than the yield strength of the energy absorption device. The retainer may include one or more preload structures adapted to apply a preloaded force upon the rigid member carried by the retainer in order to help secure the rigid member in a desired operational position. The preload structures may include one or more (e.g., an opposing pair of) lateral flexible fingers that are angled sufficiently so that, the opposing lateral fingers flex to allow the rigid member to be loaded into the openings in the retainer. The intrinsic elasticity of the lateral flexible fingers may apply a preload farce against the rigid member to help secure the rigid member in place. The one or more preload structures may optionally include one or more walls for resisting lateral movement of the rigid member.

The energy absorption module subassembly includes an energy absorption device. The energy absorption device may function to provide energy absorption to a steering column assembly, particularly during an impact collapse stroke (e.g., a secondary impact). The energy absorption device can be constructed of metal, metal alloy, plastic, any material capable of producing the desired results, or the like. The energy absorption device may be formed from a wire, a plate, or other shape. The cross section of the energy absorption device may be generally rectangular, generally circular, or generally polygonal. The cross section may remain constant throughout the entire length of the energy absorption device. The cross section may vary throughout the entire length of the energy absorption device. The energy absorption device may be formed or made using any machine or process capable of making the desired shape of the energy absorption device (e.g., a four slide machine, a transfer die). For example, the method of manufacture may be via a stamping process. It may be desired to avoid carrier locations on the side of the device, as this may produce stress risers, which may cause premature failures of the device during an impact collapse stroke (e.g., a secondary impact).

It is therefore desired to use the ends of the part to carry the part during manufacture. The first end, the second end, or both, of the energy absorption device may include a burr or other shaped portion (e.g., from the method of formation and/or machinery used). The first end, the second end, or both, of the energy absorption device may have a formed recess, in which the burr is contained. In this way the burr may not interfere with the impact collapse stroke (e.g., the energy absorption device may make contact with the housing or retainer at the forward end, or the energy absorption device may make contact with the torque sensor shaft at the rearward end). Contact of the burr with the torque sensor shaft may be avoided by choosing the stamping die direction. However, at the opposite end of the energy absorption device, the choice of die direction removes one burr, the other may be compensated for by using the formed recess technique. The energy absorption device may be bent, molded, casted, or otherwise shaped to perform the desired function, achieve the desired energy absorption, fit within the retainer of the energy absorption module subassembly, or combination thereof (e.g., having one or more generally planar segments, bends, curves, angled segments (e.g., angled toward or away from another segment), arcuate segments, the like, or combination thereof). The energy absorption device may have one or more features to assist in securing the energy absorption within the retainer. For example, the energy absorption device may include a receptacle into which the retention member of the retainer can be received for helping to secure the energy absorption device with the retainer. The retention member may engage with the walls or surface defining the receptacle of the energy absorption device. The receptacle of the energy absorption device may help maintain alignment of the bridge after it has broken away from the retainer during an impact collapse stroke. The energy absorption device may have one or more curves to generally surround a rigid member. The energy absorption device may have one or more protrusions (e.g., forming a t-shape) to secure the energy absorption device within the retainer (e.g., at one or more cutouts in the opposing side walls).

The energy absorption device may include a configuration of a generally serpentine shaped member having a first end and a second end. The energy absorption device may include one or more curved, angled, arcuate, and/or rounded segments to provide the generally serpentine shape. The generally serpentine shaped member may include a first generally flat portion that transitions to a first generally arcuate portion that has a first radius. The energy absorption device may thereafter transition to a second generally arcuate portion that has a second radius and is generally facing an opposite direction as the first generally arcuate portion for defining the generally serpentine shaped member. The energy absorption device may have a second generally flat portion that is located between (and that joins) the first and second generally arcuate portions. The second generally flat portion may be generally parallel to the first generally flat portion. The second generally flat portion may be at an angle from the first generally flat portion (e.g., forming an angle of less than 90 degrees, less than 45 degrees, less than 25 degrees, or even less than 10 degrees). A receptacle portion may extend from the opposing side of the second generally arcuate portion. The receptacle portion may include the receptacle for receiving, engaging with and/or supporting a retention member of the retainer. The first radius of the first generally arcuate portion and second radius of the second generally arcuate portion may be generally the same. The energy absorption device may have a selected width and/or thickness at each radius (e.g., width, thickness, or other geometry may vary along the length of the energy absorption device) so that one radius has a predilection to deform before (or generally differently from) another radius. The first radius may be preselected to be different from the second radius so that a rate of deformation that occurs at locations of the first radius and second radius differ from each other. This may allow for deformation of the generally serpentine shaped member to be selectively controlled. The first end and the second end of the energy absorption device may be inclined relative to each other.

The second end of the serpentine shaped member may be a terminal end of a hook portion of the generally serpentine shaped member that projects outward. The hook portion may extend from the receptacle portion, for example. The hook may engage with or generally contact another element of the steering column assembly (e.g., a shoulder of a torque sensor shaft or a portion along the profile of the torque sensor shaft), which may provide additional energy absorption. For example, the hook may act as an anchor. The hook portion may rotate downward as the bridge is deforming during an impact collapse stroke. During the impact collapse stroke, the hook portion may come in contact with the profile of the shaft, dragging along it, or catching on it (e.g. a side or shoulder) and may assist in absorbing energy.

The shaft of the steering column assembly, such as a torque sensor shaft, may have a shape that is able to engage with or make contact with the second end of the serpentine shaped member (e.g., during a collapse stroke). The profile of the torque sensor shaft may have one or more portions that are generally flat and/or generally parallel to the longitudinal axis of the torque sensor shaft. The torque sensor shaft may have one or more shoulders (e.g., an area having a larger diameter than an adjacent area) for engagement with the second end. The torque sensor shaft may have a varying diameter along its length. For example, the torque sensor shaft may have a tapered portion, forming a generally conical or frusto-conical shape. The larger diameter may be located generally toward the forward portion of the shaft (e.g., forward toward the front of the vehicle). The larger diameter may be located generally rearwardly. The side profile of the shaft may include a portion that is generally angled or slanted relative to the longitudinal axis of the shaft. The torque sensor shaft may have a unique profile (e.g., growing in diameter, decreasing in diameter, or both) along the length of the shaft. The torque sensor shaft may have one or more dips or pockets for contacting or receiving the second end of the serpentine shaped member. The torque sensor shaft may have one or more peaks, projections, or bumps for contacting the second end of the serpentine shaped member.

Alternatively, the second end of the serpentine shaped member may extend from a third generally arcuate portion having a third radius. The third generally arcuate portion may be generally facing the same direction as the first generally arcuate portion. The third generally arcuate portion may be located between and/or may connect the portion of the serpentine shaped member having the receptacle for receiving, engaging with and/or supporting a retention member of the retainer and the second end of the serpentine shaped member. The portion of the energy absorption device extending from the third generally arcuate portion to a terminal end (i.e., the second end) may be a third generally flat portion. The third generally flat portion may be generally parallel to the first generally flat portion, the second generally flat portion, or both. The third radius may be generally the same as the first radius, the second radius, or both. The third radius may be different from the first radius, the second radius, or both. It is also contemplated that the hook portion discussed above may extend from the third generally arcuate portion or the third generally flat portion. During a collapse stroke (e.g., a secondary impact), it is contemplated that the second end may contact the profile (e.g., a side or shoulder) of the shaft, such as a torque sensor shaft, which may assist in absorbing energy. Energy absorption may be achieved by coiling the third generally flat portion (e.g., by the third arcuate portion translating longitudinally).

Alternatively, the first end of the serpentine shaped member may have a ramp shape, instead of a singularly flat portion transitioning from the first end to the first arcuate portion. For example, extending from the first end toward the first arcuate portion (e.g., between the first end and the first arcuate portion), there may be a small generally flat portion, generally parallel to the longitudinal axis of the inner column tube. The small generally flat portion may generally rest within the forward pocket of the column housing (e.g., on a portion of the column housing). The generally flat portion may be joined to an angular segment. The angular segment may form an angle with the small generally flat portion. The angular segment may extend from the small generally flat portion, toward the inner column tube, forming an angle of about 120° or less, about 110° or less, about 100° or less. The angular segment may extend from the small generally flat portion, toward the inner column tube, forming an angle of about 65° or more, about 75° or more, or about 80° or more. For example, the angular segment may form an angle of about 90° so that the angular segment is generally perpendicular to the longitudinal axis of the inner column tube, generally perpendicular to the generally flat portion, or both. The opposing end of the angular segment may then transition to the ramp portion. The ramp portion may then transition to the first arcuate portion. The ramp portion may angle generally upwardly (e.g., away from the inner column tube) as it extends rearwardly. The ramp portion may form an angle of about 2° or more, about 5° or more, or about 10° or more, where the angle is measured between a plane extending generally parallel to the longitudinal axis of the inner column housing and a plane extending generally along the surface of the ramp portion. The ramp portion may form an angle of about 45° or less, about 30° or less, or about 15° or less. The shape therefore may appear as a saw tooth shape. It is contemplated that the rigid member may be present (e.g., generally located within or near the first arcuate portion). The rigid member may be absent from the energy absorption module subassembly. With the rigid body present, during an impact collapse stroke (e.g., a secondary impact), and after the coil (the first arcuate portion) has reached the rigid member, the ramp will be pulled between the retainer and the rigid member, leading to increased energy absorption. Without the rigid body present, during an impact collapse stroke (e.g., a secondary impact) the coil (the first arcuate portion) will translate longitudinally along the ramp progressively decreasing the radius of the first arcuate portion; leading to greater energy absorption. It is further envisioned, in the case of no rigid member, that a protrusion or angled backing may extend from the retainer to further support the energy absorption device, and further shape the energy absorption profile (e.g., this protrusion may have a shape of a ramp, it may or may not have clearance with the energy absorption device). The protrusion or angled backing may have a generally similar shape as the segments forming the ramp shape.

Any combination of any of the features described above with respect to the energy absorption device (e.g., serpentine shaped member) are considered to be within the scope of the teachings herein. For example, the energy absorption device may include a hook portion. The energy absorption device may include a third radius. The energy absorption device may include a ramp shape along the first portion (e.g., between the first end and the first radius). The energy absorption device may include one or more projections (e.g., forming a generally t-shaped member). The energy absorption device may include any combination, or none, of these features.

The energy absorption module subassembly may optionally include a damper. The damper may function to provide additional energy absorption characteristics, such as when an inner column tube of the steering column assembly telescopes forward within the column housing. The damper may be formed from any material suitable for providing additional energy absorption characteristics. The damper may be formed from a polymeric material, rubber, or other flexible material. The damper may generally be a structure having an opening for receiving a portion of the energy absorption device, the retention member of the retainer, or both. The damper may be positioned in a generally perpendicular position in relation to a plane of the tongue portion of the retainer. The damper may be positioned in a generally parallel position in relation to the plane of the tongue portion of the retainer. The damper may be positioned at any angle relative to a plate of the tongue portion of the retainer.

The retainer may be adapted to be installed into a column housing that has a forward facing pocket therein. The retainer may be configured for installation by introducing a forward end of the retainer and a first end of the energy absorption device into the forward facing pocket and pushing the retainer forward within the forward facing pocket. Therefore, tongue portion (i.e., the free end) associated with the retainer will be extending rearwardly within the column housing. The securing portions may also assist in securing the energy absorption module subassembly in place. For example, there may be openings within the column housing, and the securing portions may engage with the surfaces defining the openings in the column housing to provide additional securing of the retainer into the column housing (e.g., by snap fit, self-centering, or both).

The steering column assembly may optionally include an end cap that provides additional energy absorption. The end cap may serve to blunt the forward end of the inner column tube (e.g., as the inner column tube translates forward during a collapse stroke, such as a secondary impact), which may assist in providing further damping. The end cap may assist in protecting the optional damper (e.g., by reducing the likelihood of the damper being cut or becoming dislodged), increasing performance of the optional damper, or both. The end cap may be employed alone or in combination with the optional damper of the energy absorption module subassembly. The end cap may include a generally cylindrical body or a ring that is associated with the inner column tube of the steering column assembly. For example, the end cap may be positioned on or at least partially within the inner column tube (e.g., at least a portion of the body or ring being located within the inner diameter of the inner column tube). The end cap may include one or more energy absorbing elements or contact members (e.g., one or more bumpers, springing members, fingers, or a combination thereof). The energy absorbing elements may serve to contact a portion of the steering column assembly, such as a portion of the energy absorption module subassembly (e.g., an optional damper of the energy absorption module subassembly, a portion of the bridge of the energy absorption module subassembly, other part of the retainer or energy absorption device, or another area within the steering column assembly, such as the column housing) to provide additional damping or energy absorption. The energy absorbing elements or contact members may be free of contact with the portion of the steering column assembly (e.g., a portion of the energy absorption module subassembly) until the occurrence of a collapse stroke (e.g., a secondary impact), which causes the inner column tube to translate forward, thereby causing the energy absorbing element or contact member to contact the portion of the steering column assembly.

As mentioned, the end cap may have a generally cylindrical body portion or at least a portion of the end cap may be generally in the shape of a ring. The generally cylindrical body portion may be enclosed (e.g., forming a complete circle, oval, or other continuous shape). The generally cylindrical body portion may have one or more gaps (e.g., so that the shape is not completely closed, such as a C shape). The body portion or ring forming the end cap may have an inner diameter and an outer diameter. The inner diameter may be of a sufficient size that elements of the steering column assembly (e.g., at least a portion of the energy absorption module subassembly) may fit or be received within the inner diameter of the inner column tube and the end cap, when the end cap is installed within the steering column assembly, during a collapse stroke (e.g., a secondary impact), or both. The outer diameter of the body portion or ring may contact at least a portion of the inner diameter of the inner column tube when the end cap is installed or positioned within the steering column assembly. The outer shape of the body portion or ring of the end cap may generally match the shape of the inner surface or cross section of the inner column tube into which at least a portion of the end cap is positioned (e.g., to allow for positioning and securing of the end cap on or in the inner column tube).

The end cap may have one or more wings extending therefrom. The wings may be generally rearwardly facing (e.g., with the free end of one or more wings generally extending toward the steering wheel). The wings may assist in reducing vibration or audible rattling of the end cap within the inner column tube. The wings may assist in securing the end cap within the inner column tube. For example, the wings may generally flex and/or elastically deform to allow the end cap to be loaded into the forward opening of the inner column tube. The intrinsic elasticity of the wings may apply a preload force against the inner diameter or inner surface of the inner column tube to help secure the end cap in place. The wings may guide the end cap into the inner column tube during the assembly process.

The end cap may be secured to and/or within the inner column tube by one or more attachment methods or elements. Preferably, the insertion of the end cap and the securing of the end cap to the inner column tube will cause no deformation to the outer diameter of the inner column tube, as any defects (or deviation from normal) in the outer diameter of the inner column tube may affect other column assembly performance characteristics, such as telescope force and energy absorption from the clamping on the inner column tube. The end cap may be attached to the inner column tube via one or more adhesives, staking processes, press-fitting, or a combination thereof. The end cap may have one or more features allowing for a snap fit of the end cap within the inner column tube. For example, the outer surface or diameter of the end cap ring may have one or more projections, shoulders, wings, elastic members, elevated areas, depressions, openings, the like, or combination thereof. A projection, shoulder, elevated area, wing, elastic member, or the like, may engage with an opening or pocket in the inner column tube (e.g., to allow at least a portion of the end cap to snap into the inner column tube and be secured by the engagement of the portion of the end cap and the opening or pocket in the inner column tube). Alternatively, or additionally, a depression or opening in at least a portion of the end cap may engage with a projection of the inner column tube (e.g., along the inner diameter or inner surface of the inner column tube). An opening in the end cap may generally align with an opening in the inner column tube to receive a fastener, such as a screw, pin, snap, clip, bushing, rivet, the like, or combination thereof. The end cap may have one or more features allowing for engagement with existing fasteners within the inner column tube. For example, the end cap may have one or more fork-like members that permit a snap fit with (e.g., around) an existing fastener or rivet. For example, the end cap may have a fork-like member having two prongs, where a portion of the fastener is received and held therebetween. The prongs may be generally angled relative to each other or have a shape (e.g., a shape between and/or defined by the prongs) that allows for the prongs to snap around the fastener and resist pull out of the end cap from the inner column tube.

The end cap includes one or more contact members that contact a portion of the steering column assembly (e.g., a portion of the energy absorption module subassembly). The contact members may act as energy absorbing elements. These elements may provide additional damping within the steering column assembly, especially during a collapse stroke (e.g., a secondary impact). The elements may provide additional contact area between the inner column tube and the energy absorption module subassembly. For example, during a collapse stroke, the inner column tube may translate forward and the contact members may make contact with the damper or other element of the energy absorption module subassembly, providing additional damping (during normal telescopic operations) and eventually leading to the deformation of the energy absorption device and/or breakaway of the bridge from the rest of the retainer (during a secondary impact). The elements may provide protection for the optional damper. The energy absorbing elements or contact members may be in the form of one or more bumpers, one or more spring fingers, one or more other elements that may provide additional damping, or a combination thereof.

The one or more contact members of the end cap may include one or more bumpers that are generally forward-facing relative to the inner column tube. The one or more bumpers may extend from the body portion or ring of the end cap, and may extend past the forward end of the inner column tube (e.g., to serve as an area of contact between the inner column tube and an element of the steering column assembly, such as the energy absorption module subassembly (e.g., the optional damper, the bridge of the retainer, or both). The bumper may have a front face that serves as the point of contact with the energy absorption module subassembly, for example. The bumper (e.g., at least a portion of the front face) may be textured or tacky, for example, to resist slippage between the bumper and the energy absorption module subassembly (e.g., the optional damper, the bridge, or both). The front face may be generally angled to aid in retention and/or positional maintenance of the optional damper. The angle may be measured by a plane extending vertically from an edge (e.g., the bottom edge) of the bumper and a plane extending along the face of the bumper. The angle may be about 0.5 degrees or more, about 5 degrees or more, or about 10 degrees or more. The angle may be about 80 degrees or less, about 45 degrees or less, or about 20 degrees or less. The bumper may be formed at least partially from a metallic material or a metal alloy. The bumper may be formed at least partially of a polymeric material, a rubber material, a plastic material, a material that exhibits elastic deformation, or a combination thereof. To provide the tackiness or texture, one or more additional layers of material may be placed upon at least a portion of the bumper. To provide tackiness or texture, one or more treatments may be performed on at least a portion of the bumper. The texture or tackiness may be a property of the material being used to form the bumper. The texture or tackiness may be provided during the creation of the bumper (e.g., during molding). The bumper may be a generally solid. The bumper may be generally hollow.

The one or more contact members of the end cap may include one or more spring fingers. The one or more fingers may be connected to and/or extend from the body portion or ring of the end cap and terminate at a free end. The one or more fingers may extend past the forward end of the inner column tube (e.g., to serve as an area of contact between the inner column tube and an element of the steering column assembly, such as the energy absorption module subassembly (e.g., the optional damper, the bridge of the retainer, or both). The one or more fingers may reduce or eliminate the need for an optional damper within the energy absorption module subassembly; as it provides sufficient contact and damping between the inner column tube and the energy absorption module subassembly (e.g., the bridge or portion of the retainer). The one or more fingers may have a generally U-shape, a generally V-shape, a generally ovular shape, or otherwise, thereby providing a springing effect when contact is made between an element of the steering column assembly (e.g., a portion of the energy absorption module subassembly) and the area of contact of the one or more fingers. The one or more fingers may be integrally formed with the body portion or ring of the end cap. The one or more fingers may be separately formed (e.g., by stamping) and attached to the end cap. The contact members may be two spring fingers, for example. The two spring fingers may flank opposing sides of the energy absorption device, bridge, and/or other portion of the retainer while in the installed position, during a collapse stroke (e.g., a secondary impact), or both.

The end cap may be formed by a number of materials and methods. At least a portion of the end cap may be a metal material or metal alloy. At least a portion of the end cap may be machined from a solid metal or alloy, cold formed, die cast, or a combination thereof. At least a portion of the end cap may be formed from a plastic or other polymeric material. At least a portion of the end cap may be formed by injection molding, for example. The end cap may be a single, integrally formed piece. For example, a body portion or ring, one or more contact members such as bumpers, and/or one or more wings may be formed as a single piece, such as by molding. The end cap may be formed from multiple discrete pieces assembled to form the completed end cap. For example, an insert or stamping of contact members (e.g., spring fingers) may be formed and separately attached to the body portion or ring of the end cap. The discrete pieces may be formed from different materials. For example, the body portion or ring of the end cap may be formed of a plastic material, while the spring fingers are formed via metal stamping. The stamping may be attached, such as by over-molding to produce the finished end cap. The discrete pieces may be formed of the same materials. The discrete pieces may be attached via any method of attachment that will withstand any forces exerted upon the end cap (e.g., during a collapse stroke). Methods of attachment may include, but may not be limited to, overmolding techniques, adhesives, mechanical fasteners, soldering, welding, snap fitting, press fitting, riveting, the like, or combination thereof.

While the disclosure herein describes the energy absorbing elements being attached to or integrally formed with the body portion or ring of the end cap, it is contemplated that, the energy absorbing elements alone may be attached to the inner column tube (e.g., via one or more fasteners, adhesives, or other attachment elements, such as those that provide a snap fit).

During a vehicle crash event, the inner column tube may translate forward with clamp load applied until it reaches a portion of the energy absorption module subassembly (e.g., an optional damper or the bridge). The bridge of the retainer (alone or while backing the damper) resists further movement of the inner column tube. As the crash load increases, the optional damper may compress and/or be pushed clear. Continued translation forward of the inner column tube may cause the bridge to bend and eventually break away from the body of the retainer. Translation forward of the inner column tube may cause the energy absorption device to move forward (e.g., without deformation) so the first end of the energy absorption device may contact the column housing. The movement of the energy absorption device may be about 0.5 mm or greater, about 1 mm or greater, or about 2 mm or greater. The movement may be about 6 mm or less, about 5 mm or less, or about 4 mm or less (e.g., about 3 mm). When the first end of the energy absorption device makes contact with the column housing, the energy absorption device may begin to deform in free coiling (e.g., deformation at the first arcuate portion). This may allow for a more consistent breaking of the bridge and may allow the energy absorption from the energy absorption device to begin just after the breakaway event. The energy absorption device may come to rest against the rigid member. The energy absorption device may then begin to be pulled around the rigid member. The inner column tube may eventually come to rest against the crash stop in the housing.

During a crash, the retainer may be used as a compression spring and provide cushion to the rigid member (e.g., a pin, such as a needle roller bearing element, or other elongated member). After the first arcuate portion of the energy absorption device makes contact with the rigid member, the load may start to increase. With the rigid member obtaining higher applied loads, the retainer may supply reaction loads to the rigid member. This force may cause the retainer to compress and/or elastically deform. The pin during the impact may come into contact with the column housing, which may provide additional support to the rigid member and/or resist movement of the retainer, the rigid member, the first arcuate portion of the energy absorption device, or combination thereof.

Turning now to the drawings. FIG. 1 generally illustrates a steering column assembly 20 that has a forward end 22 and a rearward end 24. The steering column assembly 20 includes a shaft 26 (e.g., a torque sensor shaft, steering shaft, or both) supported within an inner column tube 30. A column housing 32 supports many elements of the steering column assembly 20, including the shaft 26, the inner column tube 30, and an energy absorption module subassembly 40.

FIGS. 2A and 2B illustrate elements of the energy absorption module subassembly 40 (see FIG. 5, for example, for the assembled subassembly), including the energy absorption device 42 to be inserted into the retainer 60 (see FIG. 2B). FIG. 2A illustrates a side view of an energy absorption device 42 having a generally serpentine shape having a first end 44 and a second end 46. The energy absorption device 42 includes a first generally flat portion 48 that transitions to a first arcuate portion 50 that has a first radius and thereafter transitions to a second arcuate portion 52 that has a second radius. The first arcuate portion 50 and second arcuate portion 52 are facing generally opposite directions. The second end 46 of the energy absorption device 42 includes a terminal end of a hook portion 56 that projects generally outward. The energy absorption device 42 also includes a receptacle 58 into which a retention member of the retainer (see FIG. 2B) can be received.

FIG. 2B illustrates a side view of a retainer 60. The retainer 60 includes a compression finger 66 located at a forward end adjacent to an additional support 68. The retainer 60 includes a bridge 70 that joins two opposing side walls of the retainer (more clearly shown in FIG. 5, for example). A retention member 72 extends from the bridge 70 that engages with or is received by the receptacle 58 of the energy absorption device (see FIG. 2A). The opposing side walls 64 each include a through hole opening 78 for receiving a rigid member (see FIGS. 3A-3C). At a rearward end, the retainer includes a tongue portion 76 for providing additional stability and strength in the steering column assembly.

FIGS. 3A, 3B and 3C illustrate the method of installing a rigid member 90 (e.g., a pin or other elongated member) into the energy absorption module subassembly 40. After the energy absorption device 42 is inserted into the retainer 60 (see FIGS. 2A and 2B), an end of the rigid member 90 is inserted into a through hole opening 78 in the side wall 64 of the retainer 60. The retainer 60 includes a preload structure 86 juxtaposed with each through hole opening 78, shown in the figures as lateral flexible fingers that are angled in relation to the opposing side walls. The preload structures 86 assist in guiding the rigid member 90 through the through hole opening 78. As the rigid member 90 is pushed through the through hole opening 78, the preload structure 86 may flex to allow the rigid member 90 to pass through the retainer 60 to a through hole opening 78 on an opposing wall 64 of the retainer 60. As is shown in the partial cutaway view of the energy absorption module subassembly in FIG. 3C, when the rigid member 90 is secured between through hole openings 78 in the opposing walls 64 of the retainer, the preload structures 86 hold the rigid member 90 in place and also assist in keeping the rigid member from vibrating against the energy absorption device 42. The energy absorption module subassembly 40 also includes the additional support 68, the energy absorption device 42, including the receptacle 58 for receiving the retention member 72 of the retainer, and a damper 92 for absorbing additional energy.

FIGS. 4A and 4B illustrate the installation of an optional damper 92. The damper 92 includes an opening for receiving the hook portion 56 of the energy absorption device 42, and in the installed position, the damper 92 is slid or otherwise positioned up to the retention member 72 of the retainer. The retention member 72 has a barbed end 74 that allows the damper 92 to be snapped in and held in place.

FIG. 5 is a perspective view of an assembled energy absorption module subassembly 40. The subassembly includes a retainer 60 having opposing side walls 64, an additional support 68 extending from the top portion of the retainer, a bridge 70 extending from the bottom portion of the retainer, and a compression finger 66 at one end, and a tongue portion 76 at the other end. The opposing side walls 64 include through hole openings 78 for receiving a rigid member 90. The rigid member 90 is further supported by preload structures 86. The subassembly can be installed into a steering column assembly (see FIGS. 6A-6D) with assistance from the securing portion which includes laterally spaced detents 82 angularly extending from the retainer 60. The subassembly includes an energy absorption device 42 (the hook portion is seen in the figure), and an optional damper 92.

FIGS. 6A, 6B, 6C, and 6D illustrate installing the energy absorption module subassembly 40 into the steering column assembly 20. The energy absorption module subassembly 40 is inserted into a pocket 34 of the column housing 32 on an angle, leading with the compression finger 66. The energy absorption module subassembly 40 includes a primary locator 94 that contacts a region of the column housing 32 and serves as the tilting point. Secondary alignment is accomplished by pushing the tongue portion 76 upward, so the secondary locators 96A can fit within the catch points 100 of the column housing. The base of the laterally spaced detents 82, form the first part of the secondary locators 96A. The symmetric compliant nature of the laterally spaced detents 82 provides a centering force. The sides 64, of the energy absorption module subassembly 40, form the other portion of the secondary locators 96B. The secondary locators 96B are a firm set of lateral travel stops. The last locating surface is contact made between the middle top of the retainer and a generally central area of the housing pocket. After contact is made at this point, and contact is made between the additional support 68 of the retainer 60 and the column housing 32, the energy absorption module subassembly 40 is continued to be rotated slightly (e.g., rocked around the tertiary locator 98), until the retainer has made contact at the housing stops or pads 102. The ends of the laterally spaced detents 82 positively clear catch points 100 of the column housing 32 and spring outward (e.g., snapping into place). Audible feedback of engagement is given, generated by the thin protrusions 84 on the end of the laterally spaced detents 82 making contact with the sides of the column housing. A plane extending from each of the outer surface of the laterally spaced detent 82 and a plane extending from the outside tip of the laterally spaced detent 82 downward and/or parallel to the thin protrusion 84 forms an angle α. The retainer 60 releases and rotates back against the ends of the laterally spaced detents 82. The counter-rotation after installation is caused by the compression finger 66 applying a load to the energy absorption device 42 within the retainer 60.

Figure 7A:
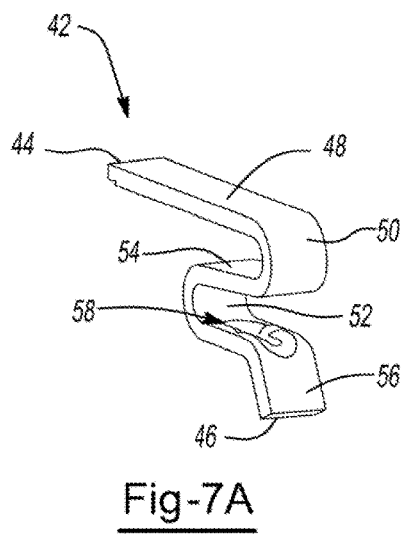
FIGS. 7A and 7B are perspective views of an energy absorption device of an energy absorption module.
Figure 7B:
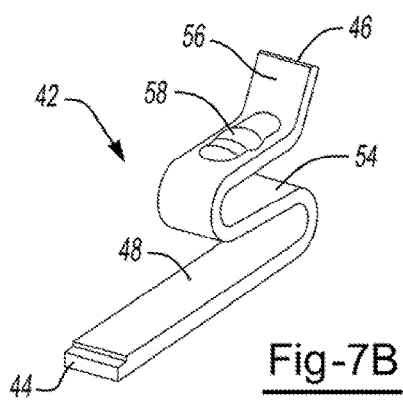

FIGS. 7A and 7B illustrate an energy absorption device 42 having a serpentine shape. The energy absorption device 42 includes a first end 44 and a second end 46. At the first end 44 is a first generally flat portion 48 that transitions to a first arcuate portion 50. The energy absorption device 42 includes a second generally flat portion 54 that transitions from the first arcuate portion 50 to a second arcuate portion 52. The first arcuate portion 50 and second arcuate portion 52 face in generally opposing directions to provide the serpentine shape. The second arcuate portion 52 transitions to the second end 46 of the energy absorption device 42. The second end 46 terminates at a hook portion 56. The region between the second arcuate portion 52 and the hook portion 56 includes a receptacle 58 for receiving a retention member of the retainer (see FIG. 8D).

Figure 8:
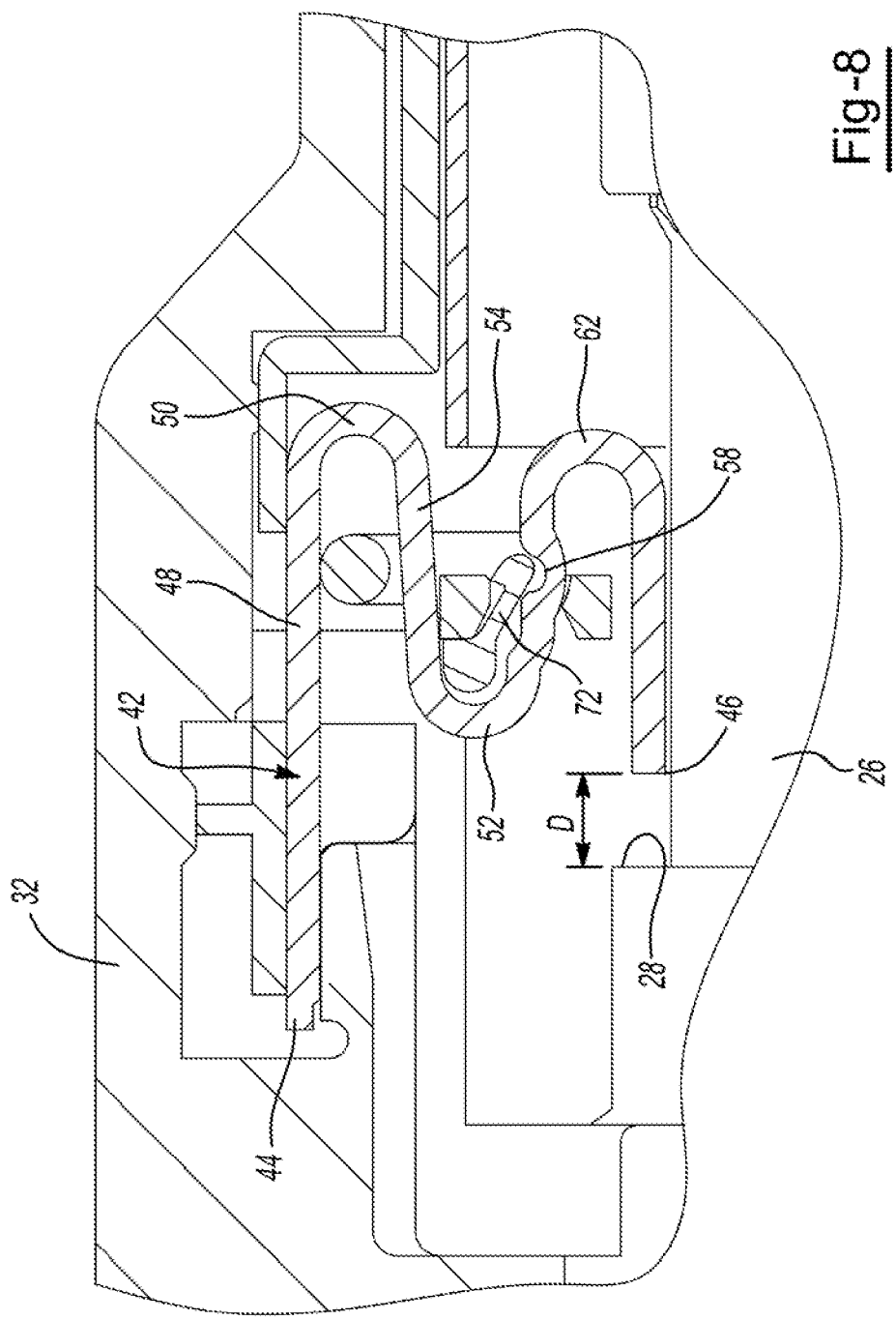
FIG. 8 is an enlarged side view of enemy absorption device of an energy absorption module.

FIG. 8 illustrates an energy absorption device 42 located within a column housing 32. The energy absorption device 42 includes a first end 44 and a second end 46. A first generally flat portion 48 extends from the first end 44 and transitions to a first arcuate portion 50. The energy absorption device 42 includes a second generally flat portion 54 that joins the first arcuate portion 50 and a second arcuate portion 52. The first arcuate portion 50 and the second arcuate portion 52 are oriented in generally opposing directions to provide a portion of the serpentine shape. The second arcuate portion 52 transitions to a third arcuate portion 62, with the receptacle 58 for receiving the retention member 72 located therebetween. The third arcuate portion 62 is generally oriented in the same direction as the first arcuate portion 50. The energy absorption device 42 terminates at the second end 46, which extends from the third arcuate portion 62. Within the steering column assembly, the second end 42 is separated from a shoulder 28 of the shaft 26 (e.g., a torque sensor shaft) by a delay distance D. During an impact collapse stroke (e.g., a secondary impact), the energy absorption device 42 may deform and eventually contact the shoulder on the shaft.

Figure 9:
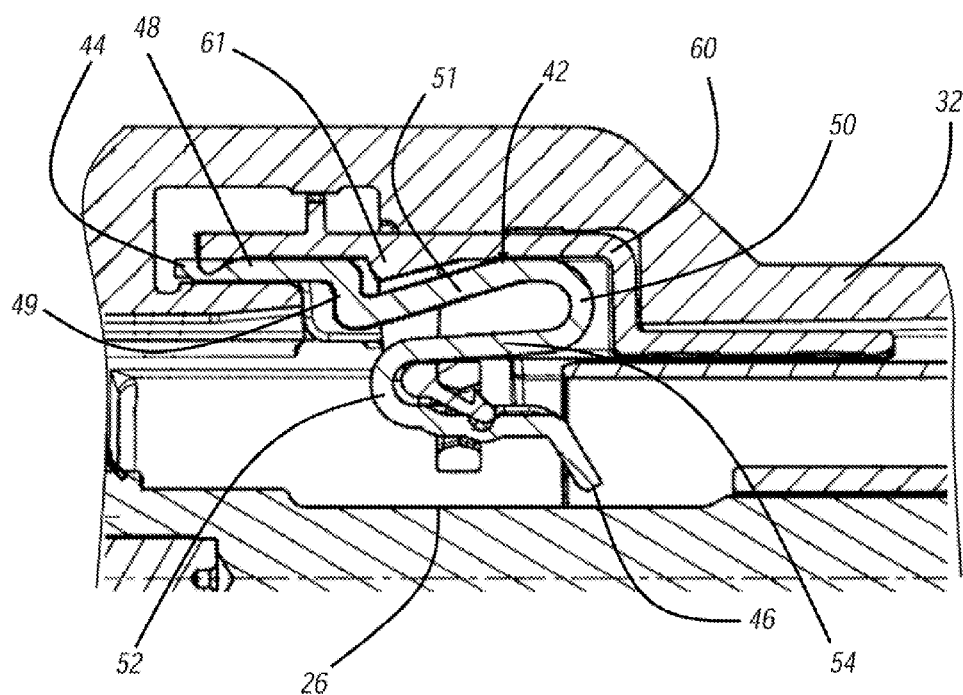
FIG. 9 is an enlarged side view of an energy absorption device of an energy absorption module.

FIG. 9 illustrates an energy absorption device 42 located within a column housing 32. The energy absorption device 42 is housed within a retainer 60. The energy absorption device 42 includes a first end 44 and a second end 46. A first generally flat portion 48 extends from the first end 44. From the opposing side of the first generally flat portion 48 extends an angular segment 49 (extending generally toward the shaft 26), which is generally perpendicular to the first generally flat portion. A ramp portion 51 extends from the angular segment 49, which then transitions to the first arcuate portion 50. The first arcuate portion 50 may be joined to the second arcuate portion 52 by a second generally flat portion 54. A rigid member is not present within the figure, though it is contemplated that a rigid member 90 may be located generally adjacent the interior of the first arcuate portion 50. The retainer 60 includes an angled backing 61 that generally matches the shape formed between the angular segment 49 and the ramp portion 51, though it is contemplated that the angled backing 61 may be omitted (e.g., to instead be a generally flat profile).

FIGS. 10A, 10B, 10C, and 10D illustrate views from different angles of a retainer 60. As is shown, the retainer 60 includes a compression finger 66 at one end and a tongue portion 76 at the opposing end. Extending from the top of the retainer is an additional support 68, and a bridge 70 extends from the bottom of the retainer, joining opposing side walls 64 of the retainer. A retention member 72 extends from the bridge. The opposing side walls 64 include opposing through hole openings 78 for receiving a rigid member 90 (see FIGS. 3A-3C), and preload structures 86 for providing additional support to the rigid member are juxtaposed with the opposing through hole openings 78. The retainer also includes laterally spaced detents 82 hingedly connected with the retainer 60. The laterally spaced detents 82 include a thin protrusion 84 at each free end.

FIGS. 11A, 11B, 11C, 11D and 11E illustrate views of a retainer 60 and energy absorption device 42. FIGS. 11A-C illustrate an assembled energy absorption module subassembly 40. The energy absorption module subassembly 40 includes a retainer 60 having a bridge 70 (with a potential breakaway location 114), cutouts 104 for receiving a portion of an energy absorption device 42, and fastening projections 108 for securing the energy absorption module subassembly 40 within a steering column assembly (not shown). FIG. 11D illustrates a view of the retainer 60, and FIG. 11E illustrates an energy absorption device 42 having a generally t-shaped area 106 for fitting within the cutouts 104 to secure the energy absorption device 42 within the energy absorption module subassembly 40. Upon an impact collapse stroke (e.g., a secondary impact), if the force exceeds a threshold amount, the bridge 70 will break away from the retainer 60.

Figure 12A:
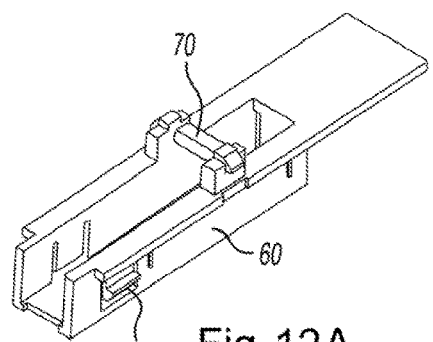
FIG. 12A is a perspective view of a retainer of an energy absorption module.
Figure 12B:
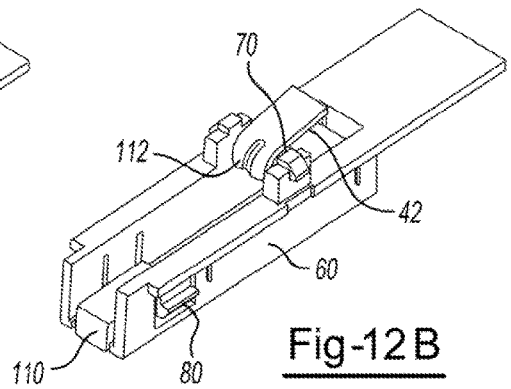
FIGS. 12B and 12C are views of the retainer of FIG. 12A with an energy absorption device installed.
Figure 12C:
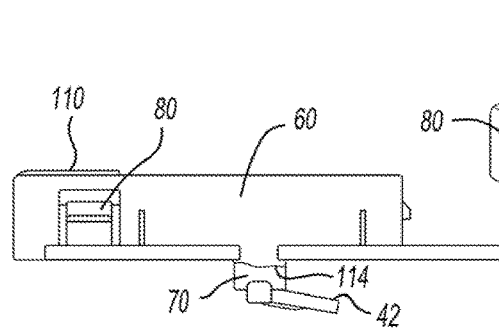
Figure 12D:
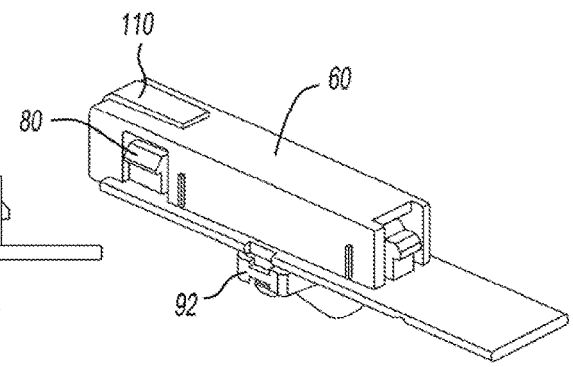
FIGS. 12D and 12E are views of an assembled energy absorption module including a damper.
Figure 12E:
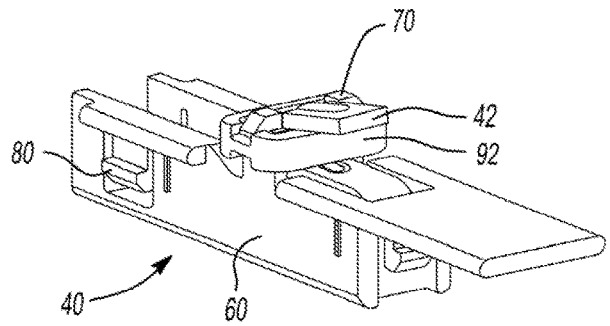

FIGS. 12A, 12B, 12C, 12D, and 12E illustrate the components and assembly of an energy absorption module subassembly 40. FIG. 12A illustrates a retainer 60 that includes a bridge 70 (and a potential breakaway location 114) and a securing portion 80 for securing the retainer 60 within a steering column assembly (not shown). FIGS. 12B and 12C illustrate an energy absorption device 42 housed within the retainer 60. During an impact collapse stroke (e.g., a secondary impact), the bridge 70 may be forced to break away from the retainer 60. The energy absorption device 42 has an arcuate portion 112 that is generally positioned around the bridge 70. A clip 110 is positioned at an end of the retainer 60 to hold the energy absorption device 42 in proper position. FIGS. 12D and 12E include a damper 92 located generally around a portion of the bridge 70 and the arcuate portion 112 of the energy absorption device.

Figure 13:
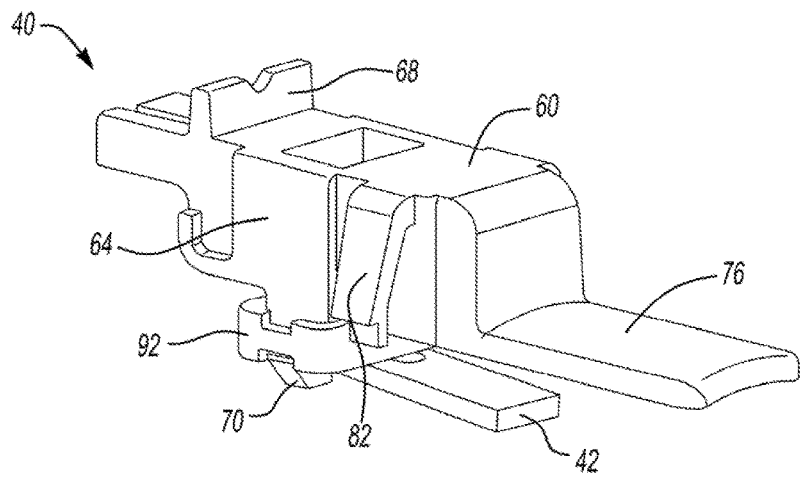
FIG. 13 is a perspective view of an assembled energy absorption module including a damper.
Figure 14A:
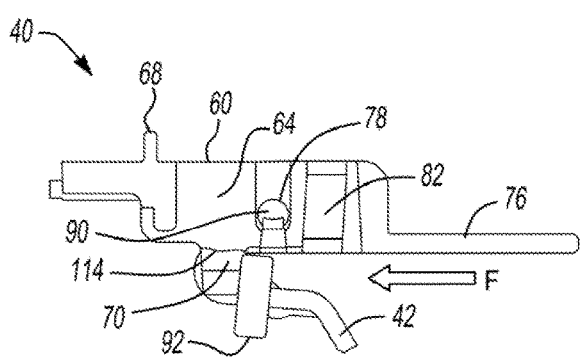
FIGS. 14A, 14B, 14C and 14D are views of an assembled energy absorption module including a damper.
Figure 14B:
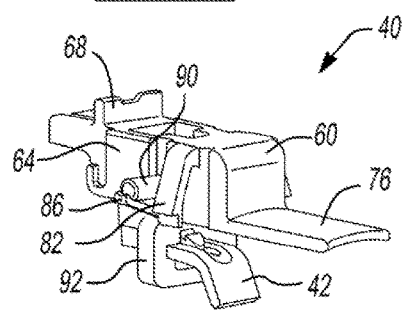
Figure 14C:
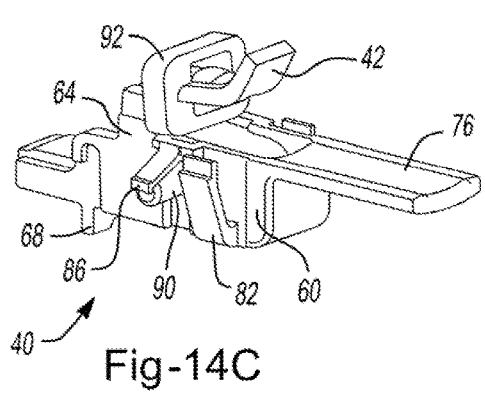
Figure 14D:
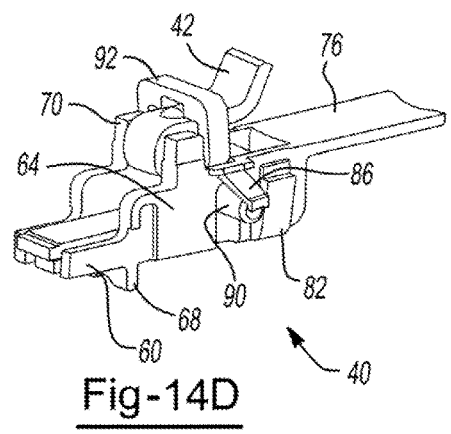

FIG. 13 illustrates an energy absorption module subassembly 40. The subassembly 40 includes a retainer 60 having a tongue portion 76, opposing side walls 64, a bridge 70 and an additional support 68. The retainer 60 includes a pair of laterally spaced detents 82 extending from the side walls 64 of the retainer 60. An energy absorption device 42 is secured within the retainer 60, and a damper 92, in a generally parallel orientation with the tongue portion, secures the energy absorption device 42 and reduces vibrations within the energy absorption module subassembly 40.

FIGS. 14A, 14B, 14C, and 14D illustrate an energy absorption module subassembly 40. The subassembly 40 includes a retainer 60 having a tongue portion 76, opposing side walls 64, a bridge 70, and an additional support 68. During an impact collapse stroke (e.g., a secondary impact), the bridge 70 may be forced to break away from the retainer 60. The retainer 60 includes a pair of laterally spaced detents 82 extending from the side walls 64 of the retainer 60. The retainer 60 includes opposing through hole openings 78 in each of the opposing side walls 64 to receive a rigid member 90 (e.g., a pin or other elongated member). The rigid member 90 is also supported by preload structures 86 extending from the opposing side walls 64 and juxtaposed with the through hole openings 78. An energy absorption device 42 is secured within the retainer 60 and a damper 92, in a generally perpendicular orientation with the tongue portion 76, secures the energy absorption device 42 and reduces vibrations within the energy absorption module subassembly 40.

FIGS. 15, 16A, 16B, and 17 illustrate an optional end cap 120 within the steering column assembly for providing additional damping within the system.

Figure 15:
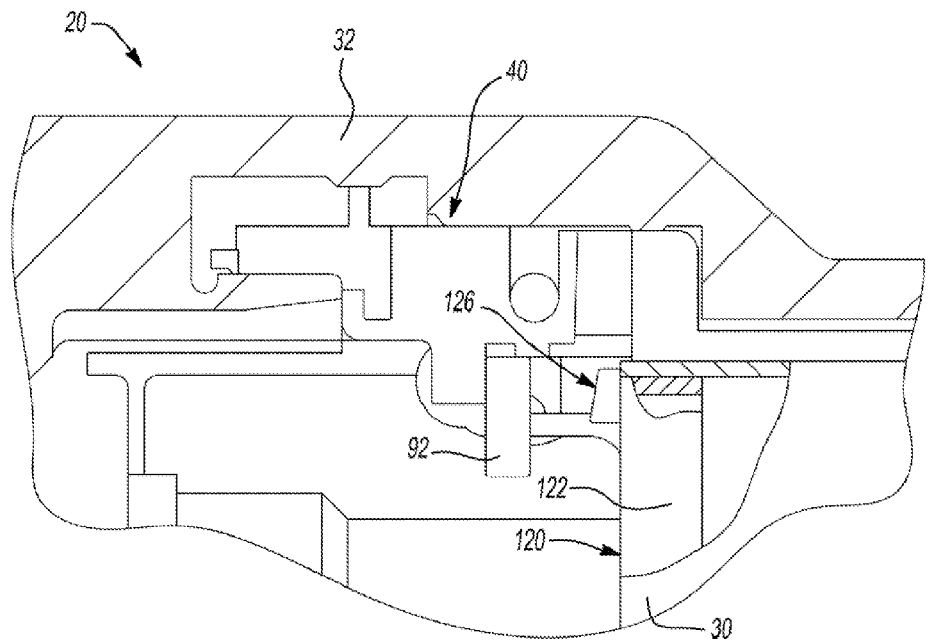
FIG. 15 illustrates a side view of a portion of a steering column assembly including an end cap associated with the inner column tube.

FIG. 15 is a side view of an energy absorption module subassembly 40 secured within the column housing 32 of a steering column assembly 20. The steering column assembly 20 includes an end cap 120 secured to an end of the inner column tube 30. The end cap 120 includes a body portion or ring 122, which is secured within the inner column tube 30. The end cap 120 includes a contact member 126 (shown as a bumper). The contact member 126 will contact the damper 92 during a collapse stroke, as the inner column tube 30 translates forward within the column housing 32.

Figure 16A:
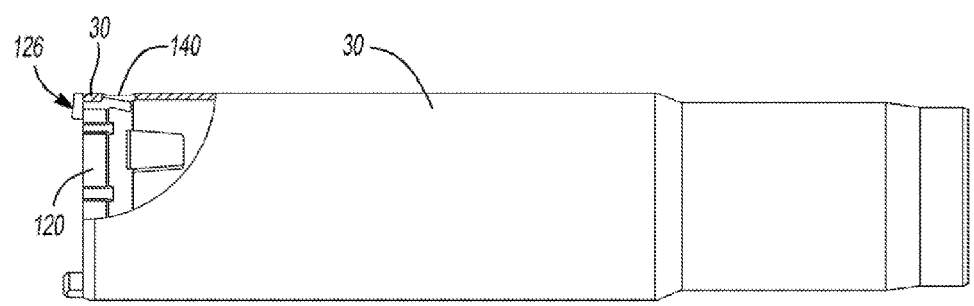
FIG. 16A illustrates an end cap associated with the inner column tube.
Figure 16B:
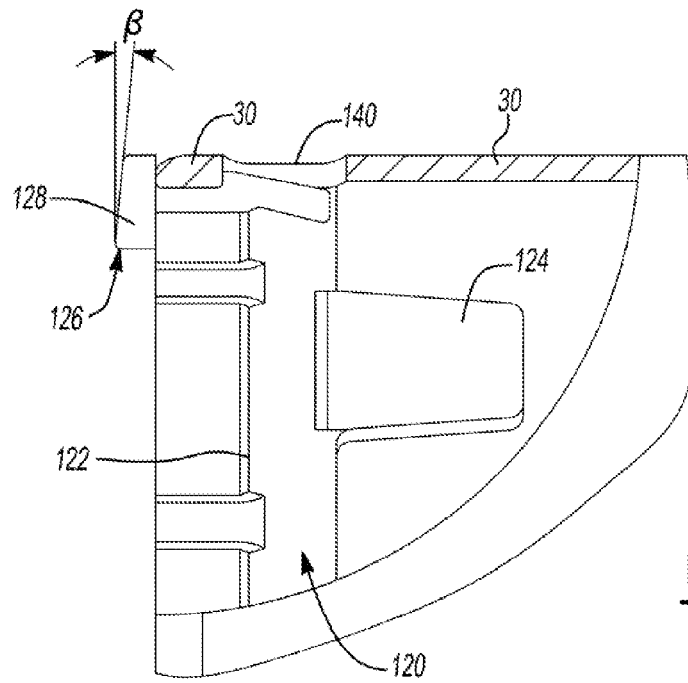
FIG. 16B illustrates an enlarged view of the end cap of FIG. 16A.

FIG. 16A illustrates an inner column tube 30 that is partially cut away to show an end cap 120 located therein. FIG. 16B is an enlarged view of the end cap 120 within the inner column tube 30. The end cap 120 includes a body portion or ring 122 that is located within the inner column tube 30 and includes one or more features for engaging with a pocket 140 of the inner column tube 30 to provide a snap-fit attachment of the end cap 120 to the inner column tube 30. The end cap 120 includes one or more wings 124, which provide additional securing and stability of the end cap within the inner column tube. The end cap 120 includes a contact member 126, shown here as a bumper 128. The bumper 128 has an angled front face, shown as angle β, where the angle is measured by a plane extending vertically from an edge (e.g., the bottom edge) of the bumper and a plane extending along the face of the bumper.

Figure 17:
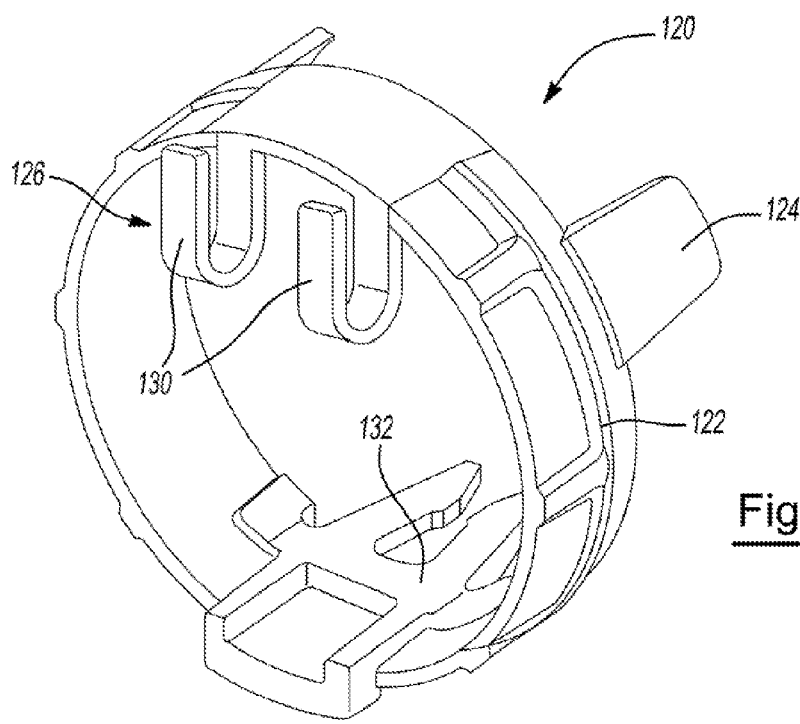
FIG. 17 illustrates a perspective view of an end cap.

FIG. 17 illustrates a perspective view of an end cap 120. The end cap 120 includes a body portion or ring 122 and one or more wings 124. The end cap 120 also includes a contact member 126, shown as two spring fingers 130 extending from the body portion or ring 122 in a generally U-shape. The end cap 120 also includes an attachment member 132, where the attachment member is adapted to engage with an existing rivet or other fastener within the inner column tube (not shown) to secure the end cap 120 within the inner column tube and/or resist pullout of the end cap 120 from the inner column tube.

The optional end cap 120 is not limited to the end cap as shown in the figures. For example, the end cap may include any, any combination, or all of a body portion or ring 122, one or more wings 124, one or more contact members 126 (which may be one or more bumpers 128, one or more spring fingers 130, or both), and one or more attachment members 132.

Figure 18A:
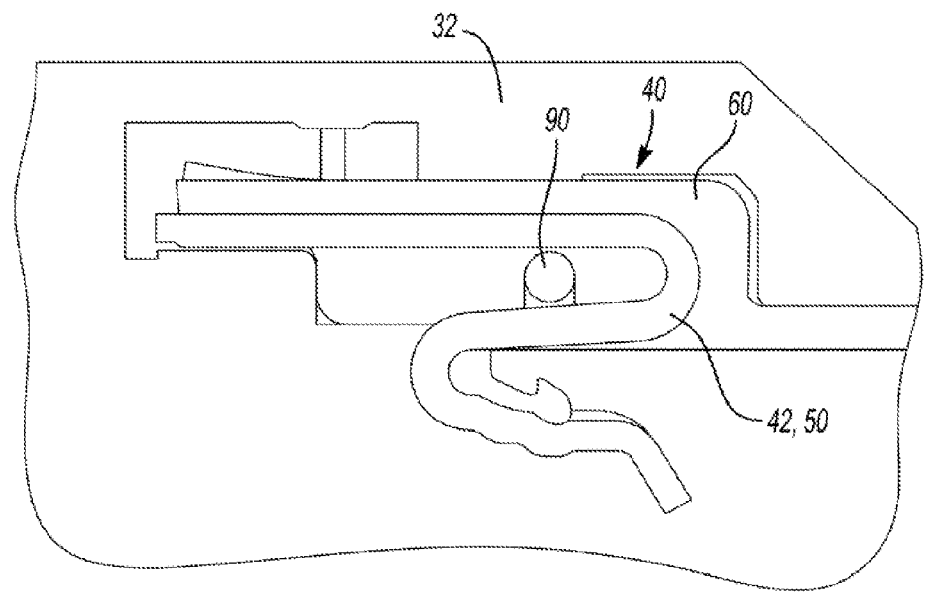
FIGS. 18A, 18B, 18C, 18D, 18E, 18F and 18G illustrate deformation of the energy absorption module during a collapse stroke, such as a secondary impact.
Figure 18B:
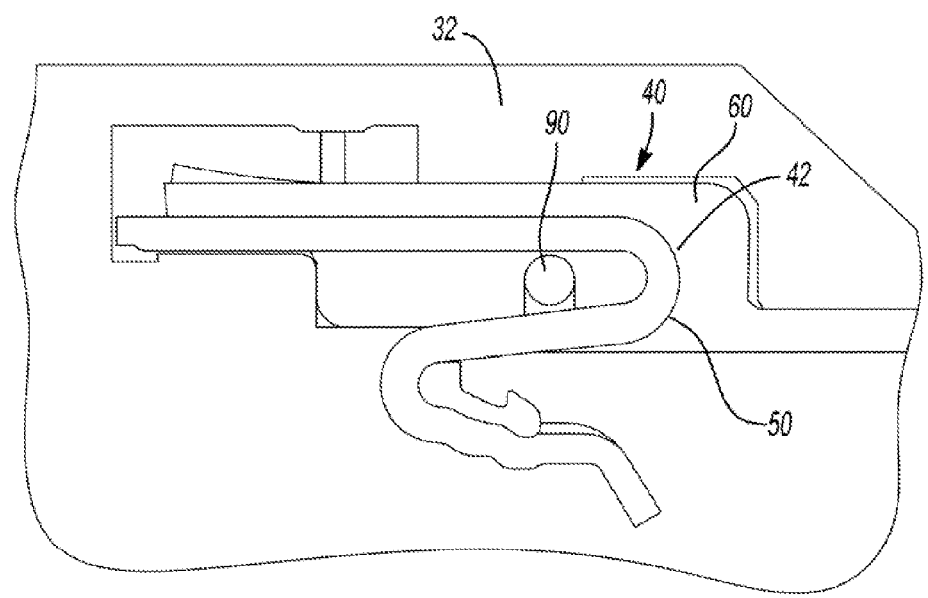
Figure 18C:
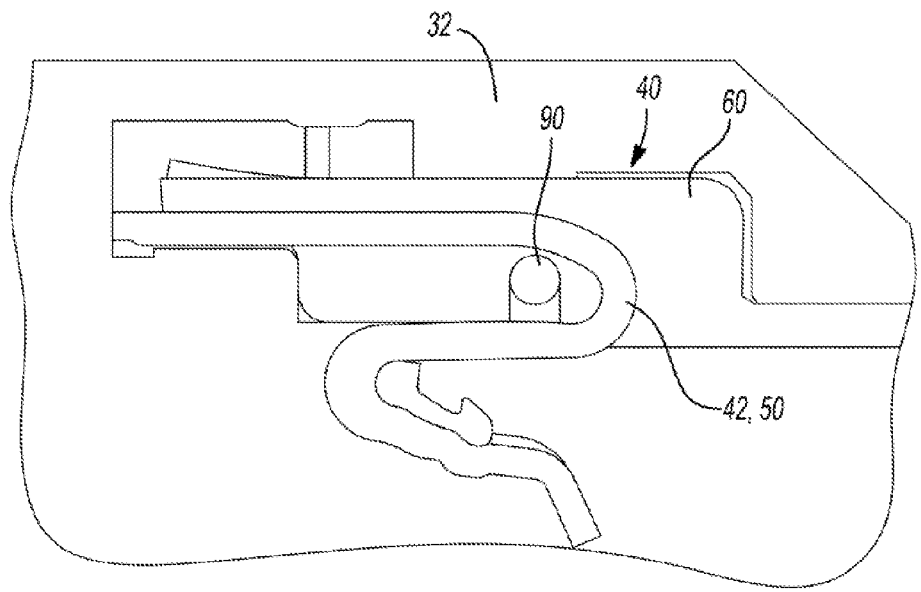
Figure 18D:
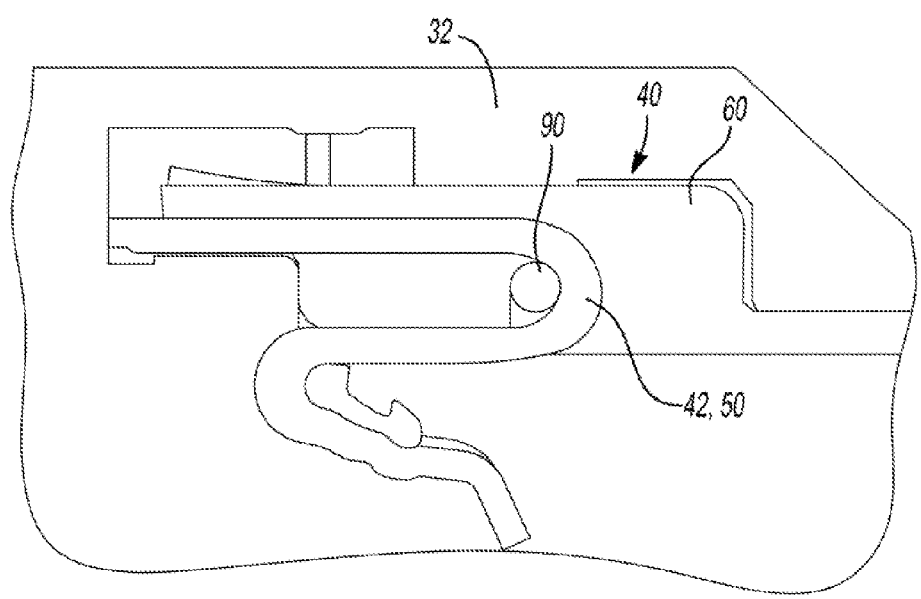
Figure 18E:
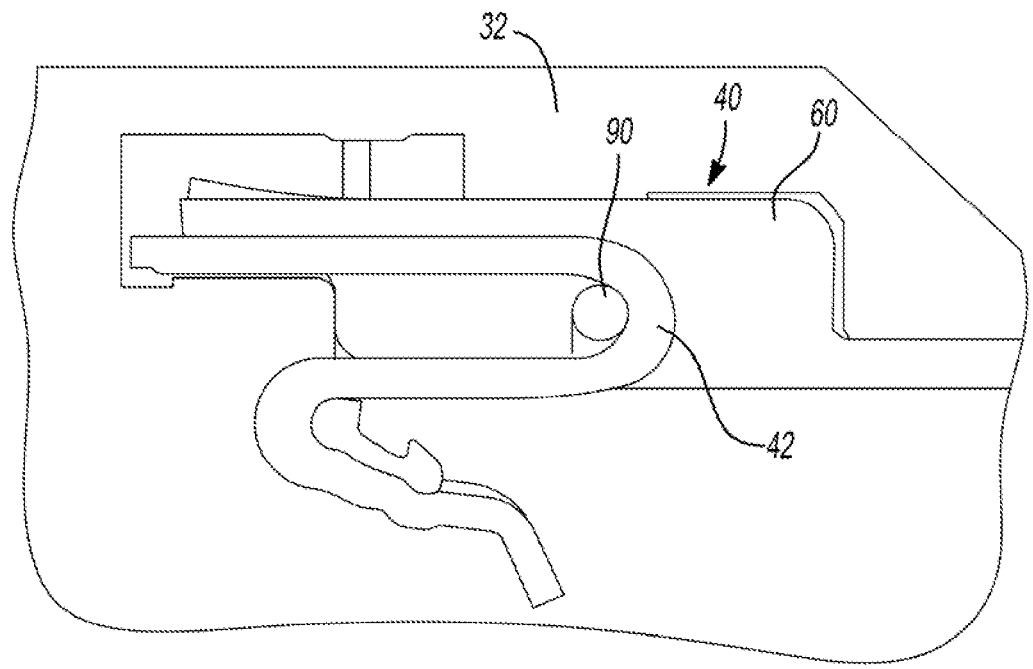
Figure 18F:
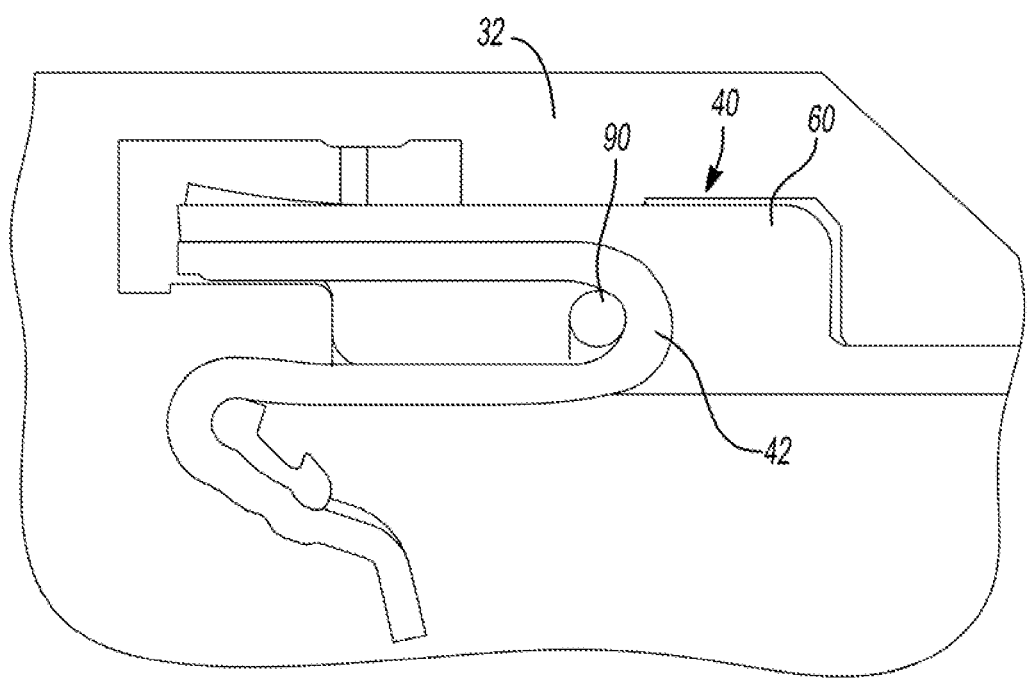
Figure 18G:
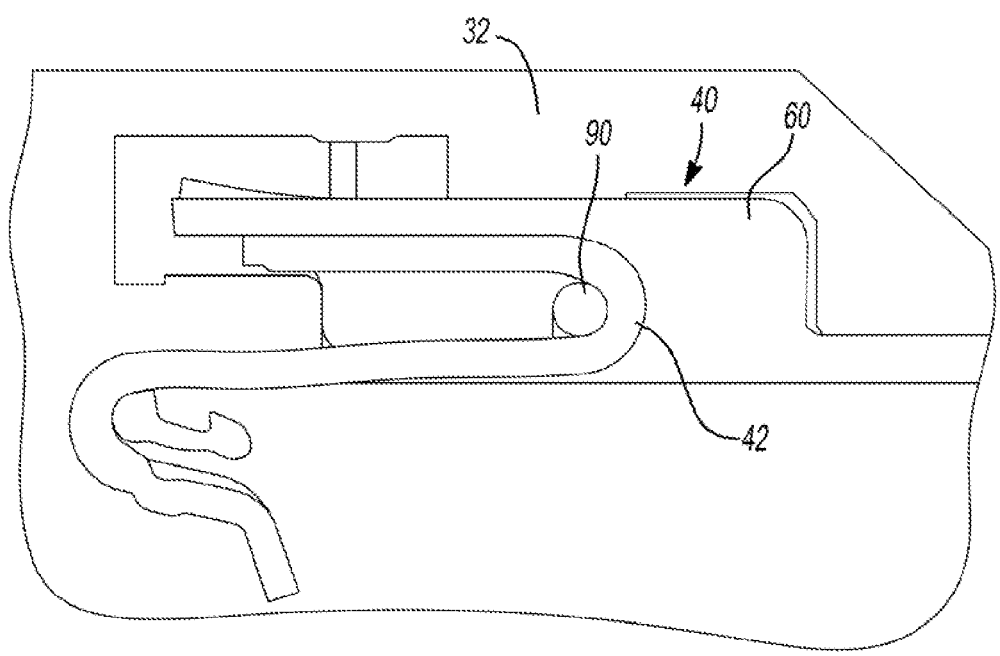

FIGS. 18A-18G illustrate the energy absorption of the energy absorption module subassembly 40 within a column housing 32 of a steering column assembly during an impact collapse stroke (e.g., a secondary impact). For clarity, the inner column tube of the steering column assembly is not shown. See FIGS. 10A-10D, for example, for more detailed images of the structure of the energy absorption module subassembly 40. An optional damper and/or end cap associated with the inner column tube is also not shown, for clarity, though it is within the scope of the teachings to have either or both. The energy absorption module subassembly 40 includes a retainer 60 that houses an energy absorption device 42 and rests within the column housing 42. The energy absorption module includes a bridge joining two walls of the retainer (see FIGS. 10A-10D, for example). The energy absorption device 42 is supported by the retainer, a rigid member 90 (e.g., a pin), and a retention member 72 extending from the bridge. A damper 92 is located on the energy absorption device 42 and held in place by the retention member 72. FIG. 18A shows the energy absorption module subassembly 40 prior to impact. During an impact collapse stroke, the inner column tube is forced forward relative to the vehicle until it reaches the damper 92. The bridge 70 of the retainer 60 backing the damper 92 may bend but resists further movement. The energy absorption device 42 translates slightly forward without deforming (FIG. 18B) and then comes to a rest against the column housing 32 (FIG. 18C). The energy absorption device 42 then begins to deform, first by free coiling, with the first generally arcuate portion 50 moving toward the rigid member 90 (FIG. 18C). The energy absorption device continues to travel until it comes to rest on the rigid member 90 (FIG. 18D). As the crash load increases beyond a threshold load, the damper 92 is compressed and the load increases to a point that the bridge 70 breaks away from the retainer as a whole, and the load is transferred to the energy absorption device 42 (FIG. 18D). The energy absorption device 42 is then pulled around the rigid member 90 as the steering column assembly is further compressed (FIGS. 14E and 14F). Energy absorption is increased due to the added friction of the interaction between the energy absorption device 42 and the rigid member 90. Finally, the inner column tube comes to rest within the column housing 32 (FIG. 14G).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As can be appreciated, variations in the above teachings may be employed. For example, rather than a snap-fit design, or in addition to a snap-fit design, the retainer may be attached to the column housing using other methods of fastening, such as screws. The energy absorption can also be tuned by changing the thickness, width, or length of the energy absorption device. The diameter of the rigid member may be changed or may be removed entirely. The breakaway force of the bridge can be altered by changing the features of size, cross section, material, or the like, of the bridge on the retainer. The surfaces adjacent to the bridge may be changed (e.g., to alter the step) to affect breakaway characteristics. A notch may be added to further control the location and load at which the breakaway event happens.

Any numerical values recited herein include all values from the lower value to the upper value in increments of one unit provided that there is a separation of at least 2 units, between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein even if not verbally described. Further, geometries shown in the drawings (though not intended to be limiting) are also within the scope of the teachings, even if not verbally described.

What is claimed is:

1. An energy absorption module subassembly for a steering column assembly comprising:
   a. an energy absorption device;
   b. a retainer assembled with the energy absorption device configured for:
      i. installation into at least a portion of a column housing of the steering column assembly;
      ii. supportively carrying the energy absorption device at least partially within the retainer; and
      iii. enabling the retainer to at least partially deform in response to a load occasioned during an impact collapse stroke of an inner column tube of the steering column assembly that forces the retainer to translate in a forward direction;
      wherein the retainer absorbs energy during the impact collapse stroke of the inner column tube by both plastic deformation of the retainer and the translation in the forward direction; and
      wherein the energy absorption device absorbs energy by plastic deformation during the impact collapse stroke of the inner column tube, and at least a portion of the energy absorption by the energy absorption device results from plastic deformation that occurs after the retainer has translated in the forward direction.

2. The energy absorption module subassembly of claim 1, wherein the energy absorption device includes a configuration of a generally serpentine shaped member having a first end and a second end.

3. The energy absorption module subassembly of claim 2, wherein the energy absorption device includes a configuration of a generally serpentine shaped member that includes a first generally flat portion extending from the first end toward a first arcuate portion that has a first radius and thereafter transitions to a second arcuate portion that has a second radius and is generally facing an opposite direction as the first arcuate portion for defining the generally serpentine shaped member.

4. The energy absorption module subassembly of claim 3, wherein the first radius is preselected to be different from the second radius so that a rate of deformation that occurs at locations of the first radius and second radius differ from each other and deformation of the generally serpentine shaped member can be selectively controlled.

5. The energy absorption module subassembly of claim 1, wherein the energy absorption device includes a configuration of a generally serpentine shaped member having a first end and a second end and wherein the second end is a terminal end of a hook portion of the generally serpentine shaped member that projects outward.

6. The energy absorption module subassembly of claim 1, wherein the retainer includes a retention member and the energy absorption device includes a receptacle into which the retention member can be received for helping to secure the energy absorption device with the retainer.

7. The energy absorption module subassembly of claim 1, wherein the retainer has a securing portion that is adapted to be mechanically fit within a portion of the column housing of the steering column assembly.

8. The energy absorption module subassembly of claim 1, wherein the retainer is configured to supportively carry the energy absorption device and includes a tongue portion that extends away from the retainer and is configured to be located in a space between the column housing and the inner column tube to help resist dislocation of the retainer from its installed position.

9. The energy absorption module subassembly of claim 1, wherein the retainer is adapted to be installed into the column housing that has a forward facing pocket defined therein and the retainer is configured for installation by introducing a forward end of the retainer and a first end of the energy absorption device into the forward facing pocket and pushing the retainer forward and toward the forward facing pocket so that a tongue portion associated with the retainer substantially opposes at least a portion of the column housing in a location of the column housing into which the inner column tube will be longitudinally and telescopically inserted.

10. The energy absorption module subassembly of claim 1, wherein the retainer also carries a rigid member that provides a surface for guiding plastic deformation of the energy absorption device.

11. The energy absorption module subassembly of claim 10, wherein the rigid member has a yield strength that is higher than a yield strength of the energy absorption device.

12. The energy absorption module subassembly of claim 1, wherein the retainer includes one or more preload structures adapted to apply a preloaded force upon a rigid member carried by the retainer in order to help secure the rigid member in a desired operational position.

13. The energy absorption module subassembly of claim 12, wherein the one or more preload structures include a pair of opposing lateral flexible fingers that are angled sufficiently so that when the rigid member is loaded, the opposing lateral flexible fingers flex to allow the loading and intrinsic elasticity of the opposing lateral flexible fingers to apply a preload force against the rigid member to help secure the rigid member in place, and which also optionally includes one or more walls for resisting lateral movement of the rigid member.

14. The energy absorption module subassembly of claim 1, wherein the retainer has a first end and a second end, wherein the first end is adapted to be located toward a forward portion of a vehicle relative to the second end, wherein the retainer includes:
  a. a pair of generally opposing side walls and a bridge that adjoins the pair of generally opposing side walls, each of the side walls having a through hole opening therein adapted to receive a rigid member and also having a pair of laterally spaced outwardly projecting compression fingers substantially juxtaposed with the through hole opening in each side wall;
  b. a longitudinally-oriented compression finger extending toward the first end for applying pressure to an energy absorption member; and
  c. a retention member that is disposed in a location between the generally opposing side walls and that extends from the bridge;
  d. a securing portion that is carried on the retainer and includes a pair of laterally spaced detents that are hingedly connected to the retainer for allowing a snap fit of the retainer into the column housing; and
  e. a tongue portion that adjoins the second end and is located toward a rear portion of the vehicle relative to the first end;
wherein the retainer is integrally formed as a single body.

15. The energy absorption module subassembly of claim 14, wherein the retainer carries the energy absorption device that includes a configuration of a generally serpentine shaped member that includes a first forward-facing end portion that is engaged by the longitudinally-oriented compression finger of the retainer that transitions to a first arcuate portion that has a first radius and thereafter transitions to a second arcuate portion that has a second radius and is generally facing an opposite direction as the first arcuate portion, for defining the generally serpentine shaped member;
  wherein the first radius is preselected to be different from the second radius so that a rate of deformation that occurs at locations of the first radius and second radius differ from each other and the deformation of the generally serpentine shaped member can be selectively controlled;
  wherein the generally serpentine shaped member includes a first end and a second end;
  wherein the generally serpentine shaped member includes a receptacle; and
  wherein the retention member is received in the receptacle.

16. The energy absorption module subassembly of claim 15, wherein the generally serpentine shaped member is further defined by a third arcuate portion that has a third radius and thereafter transitions to the second end of the generally serpentine shaped member, wherein the third radius is generally facing a same direction as the first arcuate portion.

17. The energy absorption module subassembly of claim 15, wherein the second end is a terminal end of a hook portion of the generally serpentine shaped member that projects outward.

18. The energy absorption module subassembly of claim 15, wherein the rigid member is positioned to be in a preloaded condition through each of the through hole openings of the side walls of the retainer and upon installation of the generally serpentine shaped member the rigid member is located between opposing surfaces that define the first arcuate portion of the generally serpentine shaped member.

19. A steering column assembly comprising:
  a. a column housing;
  b. an inner column tube adapted for longitudinal translation relative to the column housing; and
  c. the energy absorption module subassembly of claim 1.

20. The steering column assembly of claim 19, wherein the inner column tube includes an end cap secured thereto, wherein the end cap includes:
  a. a body portion adapted to be at least partially secured on or within a forward end of the inner column tube;
  b. one or more contact members secured to and extending forward from the body portion, wherein the one or more contact members are adapted to contact a portion of the energy absorption module subassembly during longitudinal translation of the inner column tube.

* * * * *